US008719691B2

(12) United States Patent
Kawabe et al.

(10) Patent No.: US 8,719,691 B2
(45) Date of Patent: May 6, 2014

(54) DOCUMENT PROVIDING SYSTEM AND COMPUTER-READABLE STORAGE MEDIUM

(75) Inventors: Shigehisa Kawabe, Kanagawa (JP); Setsu Kunitake, Kanagawa (JP); Masao Nukaga, Kanagawa (JP); Akira Suzuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1368 days.

(21) Appl. No.: 11/748,626

(22) Filed: May 15, 2007

(65) Prior Publication Data

US 2008/0133618 A1   Jun. 5, 2008

(30) Foreign Application Priority Data

Dec. 4, 2006   (JP) .................... 2006-327533

(51) Int. Cl.
*G06F 17/00* (2006.01)
(52) U.S. Cl.
USPC .......................................................... 715/229
(58) Field of Classification Search
USPC .................. 715/229, 239; 707/610, 634, 638
See application file for complete search history.

(56) References Cited

U.S. PATENT DOCUMENTS

| | | | |
|---|---|---|---|
| 5,671,428 A * | 9/1997 | Muranaga et al. ............ | 715/751 |
| 5,778,365 A | 7/1998 | Nishiyama | |
| 5,801,648 A | 9/1998 | Satoh et al. | |
| 5,806,078 A * | 9/1998 | Hug et al. ..................... | 715/205 |
| 5,819,295 A | 10/1998 | Nakagawa et al. | |
| 5,897,643 A | 4/1999 | Matsumoto | |
| 5,940,617 A | 8/1999 | Tamura | |
| 5,940,830 A | 8/1999 | Ochitani | |
| 5,983,241 A | 11/1999 | Hoshino | |
| 6,094,654 A | 7/2000 | Van Huben et al. | |
| 6,216,140 B1 | 4/2001 | Kramer | |
| 6,272,678 B1 | 8/2001 | Imachi et al. | |

(Continued)

FOREIGN PATENT DOCUMENTS

| | | |
|---|---|---|
| CN | 1577324 | 2/2005 |
| EP | 1083492 A2 | 3/2001 |

(Continued)

OTHER PUBLICATIONS

Stoica et al., "A Scalable Peer-to-peer Lookup Service for Internet Applications"; MIY Laboratory for Computer Science; Aug. 27-31, 2001. San Diego, CA; pp. 1-12.

(Continued)

*Primary Examiner* — Laurie Ries
(74) *Attorney, Agent, or Firm* — Gesmer Updegrove LLP

(57) ABSTRACT

There is provided a document providing system including a derivation relationship registration unit that, when receiving an instruction to register a second electronic-document that is an updated version of a first electronic document, registers a derivation relationship indicating that the second electronic document is derived from the first electronic document in a derivation relationship storage unit; an input-output relationship registration unit that generates input-output relationship information indicating an updated electronic document to be provided in response to a document request that designates a requested electronic document based on the derivation relationship registered in the derivation relationship storage unit and registers the input-output relationship information in an input-output relationship storage unit; and a providing unit that, when receiving a document request, obtains an updated electronic document corresponding to a requested electronic document designated in the document request based on the input-output relationship information and provides the updated electronic document.

15 Claims, 21 Drawing Sheets

(56) References Cited

U.S. PATENT DOCUMENTS

| | | | |
|---|---|---|---|
| 6,289,460 B1 | 9/2001 | Hajmiragha | |
| 6,615,253 B1 | 9/2003 | Bowman-Amuah | |
| 6,662,230 B1 | 12/2003 | Eichstaedt et al. | |
| 7,051,275 B2* | 5/2006 | Gupta et al. | 715/201 |
| 7,086,003 B2 | 8/2006 | Demsky et al. | |
| 7,260,584 B2* | 8/2007 | Hailey et al. | 1/1 |
| 7,791,770 B2 | 9/2010 | Nomura | |
| 2001/0027554 A1 | 10/2001 | Imachi et al. | |
| 2002/0035525 A1 | 3/2002 | Yokota et al. | |
| 2002/0065812 A1 | 5/2002 | Keith, Jr. | |
| 2002/0091651 A1 | 7/2002 | Petrogiannis et al. | |
| 2002/0120506 A1 | 8/2002 | Hagen | |
| 2002/0154010 A1 | 10/2002 | Tu et al. | |
| 2002/0184366 A1 | 12/2002 | Kimoto et al. | |
| 2003/0046363 A1 | 3/2003 | Ezato | |
| 2003/0120655 A1 | 6/2003 | Ohwada et al. | |
| 2003/0154071 A1 | 8/2003 | Shreve | |
| 2003/0159035 A1 | 8/2003 | Orthlieb et al. | |
| 2003/0182262 A1 | 9/2003 | Yamamoto et al. | |
| 2004/0117363 A1 | 6/2004 | Ohno | |
| 2004/0148278 A1* | 7/2004 | Milo et al. | 707/3 |
| 2004/0167921 A1 | 8/2004 | Carson et al. | |
| 2004/0172394 A1 | 9/2004 | Smolsky | |
| 2004/0205653 A1* | 10/2004 | Hadfield et al. | 715/530 |
| 2004/0221172 A1 | 11/2004 | Stamos et al. | |
| 2004/0237027 A1* | 11/2004 | Wakita et al. | 715/500 |
| 2004/0243576 A1 | 12/2004 | Shrivastava et al. | |
| 2004/0255160 A1 | 12/2004 | Stamos et al. | |
| 2004/0264811 A1 | 12/2004 | Yano et al. | |
| 2005/0004885 A1 | 1/2005 | Pandian et al. | |
| 2005/0021980 A1 | 1/2005 | Kanai | |
| 2005/0033777 A1 | 2/2005 | Moraes et al. | |
| 2005/0060306 A1* | 3/2005 | Hattori et al. | 707/3 |
| 2005/0060537 A1 | 3/2005 | Stamos et al. | |
| 2005/0071755 A1* | 3/2005 | Harrington et al. | 715/511 |
| 2005/0091287 A1* | 4/2005 | Sedlar | 707/200 |
| 2005/0144308 A1 | 6/2005 | Harashima et al. | |
| 2005/0171970 A1* | 8/2005 | Ozzie et al. | 707/102 |
| 2005/0182785 A1 | 8/2005 | Oswalt | |
| 2006/0010097 A1 | 1/2006 | Hashimoto | |
| 2006/0047922 A1 | 3/2006 | Johnson et al. | |
| 2006/0050648 A1 | 3/2006 | Eydelman | |
| 2006/0112139 A1* | 5/2006 | Maple et al. | 707/104.1 |
| 2006/0122983 A1* | 6/2006 | King et al. | 707/3 |
| 2006/0122985 A1 | 6/2006 | Yamamoto et al. | |
| 2006/0136513 A1* | 6/2006 | Ngo et al. | 707/203 |
| 2006/0161516 A1 | 7/2006 | Clarke et al. | |
| 2006/0242118 A1* | 10/2006 | Engel | 707/3 |
| 2006/0294054 A1* | 12/2006 | Kudo et al. | 707/1 |
| 2006/0294152 A1 | 12/2006 | Kawabe et al. | |
| 2006/0294373 A1 | 12/2006 | Stamos et al. | |
| 2007/0011211 A1* | 1/2007 | Reeves et al. | 707/203 |
| 2007/0094740 A1 | 4/2007 | Shudo | |
| 2007/0112742 A1 | 5/2007 | Dumais et al. | |
| 2007/0130166 A1 | 6/2007 | Takahashi | |
| 2007/0139701 A1 | 6/2007 | Nomura | |
| 2007/0162441 A1 | 7/2007 | Idicula et al. | |
| 2007/0288438 A1 | 12/2007 | Epstein | |
| 2007/0299969 A1 | 12/2007 | Kunitake et al. | |
| 2008/0005024 A1 | 1/2008 | Kirkwood | |
| 2008/0018926 A1 | 1/2008 | Abraham et al. | |
| 2008/0040388 A1 | 2/2008 | Petri et al. | |
| 2008/0115055 A1 | 5/2008 | Sadovsky et al. | |
| 2008/0177755 A1 | 7/2008 | Stern et al. | |
| 2009/0024647 A1 | 1/2009 | Hein | |
| 2009/0083831 A1 | 3/2009 | Kanai | |
| 2009/0198765 A1 | 8/2009 | Stamos et al. | |
| 2009/0228969 A1 | 9/2009 | Garg et al. | |

FOREIGN PATENT DOCUMENTS

| | | |
|---|---|---|
| JP | 62241061 | 10/1987 |
| JP | 6077994 | 3/1994 |
| JP | 7056794 | 3/1995 |
| JP | 8292691 | 11/1996 |
| JP | 9034763 A | 2/1997 |
| JP | 9128380 A | 5/1997 |
| JP | 9223055 A | 8/1997 |
| JP | 9223056 | 8/1997 |
| JP | 9223130 A | 8/1997 |
| JP | 11053243 | 2/1999 |
| JP | 11143752 A | 5/1999 |
| JP | 11143755 A | 5/1999 |
| JP | 11327980 | 11/1999 |
| JP | 2000020377 | 1/2000 |
| JP | 2000347943 | 12/2000 |
| JP | 2001056809 A | 2/2001 |
| JP | 2001125812 A | 5/2001 |
| JP | 2001265760 A | 9/2001 |
| JP | 2001350667 | 12/2001 |
| JP | 2002014978 | 1/2002 |
| JP | 2002016788 | 1/2002 |
| JP | 2002123414 A | 4/2002 |
| JP | 2002183141 A | 6/2002 |
| JP | 3349978 | 9/2002 |
| JP | 2002328865 | 11/2002 |
| JP | 2003058395 | 2/2003 |
| JP | 2003085089 A | 3/2003 |
| JP | 2003150423 A | 5/2003 |
| JP | 2003173329 A | 6/2003 |
| JP | 2003223363 A | 8/2003 |
| JP | 2003303122 | 10/2003 |
| JP | 2004021529 A | 1/2004 |
| JP | 2004110691 A | 4/2004 |
| JP | 2004110692 | 4/2004 |
| JP | 2004287784 A | 10/2004 |
| JP | 2004310244 A | 11/2004 |
| JP | 2005135211 | 5/2005 |
| JP | 2005518602 | 6/2005 |
| JP | 2005189995 A | 7/2005 |
| JP | 2005316715 A | 11/2005 |
| JP | 2005316815 A | 11/2005 |
| JP | 2005332010 A | 12/2005 |
| JP | 2005338935 | 12/2005 |
| JP | 2006024059 | 1/2006 |
| JP | 2006053686 | 2/2006 |
| JP | 2006516775 A | 7/2006 |
| JP | 2006251977 A | 9/2006 |
| JP | 2007004649 | 1/2007 |
| KR | 1020060049337 | 5/2006 |
| KR | 1020060092859 | 8/2006 |
| WO | 03073272 | 9/2003 |

OTHER PUBLICATIONS

Office Action for U.S. Appl. No. 11/282,022, filed Nov. 17, 2005; Shigehisa Kawabe; Document Management Server, Document Management System, Computer Readable Recording Medium, Document Management Method, Client of Document Management System, and Node.

Office Action issued on Feb. 21, 2009 from the Chinese Patent Office for corresponding Chinese Patent Application No. 200710005902.4, with English translation.

US Office Action issued in U.S. Appl. No. 11/942,943 mailed on Jan. 19, 2010.

US Office Action issued in connection with U.S. Appl. No. 11/753,690, mailed on Nov. 5, 2009.

US Office Action issued in connection with U.S. Appl. No. 11/282,022, mailed on Dec. 11, 2009.

Office Action for U.S. Appl. No. 11/753,690, mailed on May 28, 2009.

Office Action for U.S. Appl. No. 11/671,519, mailed on Jun. 2, 2009.

U.S. Appl. No. 11/753,690, filed May 25, 2007, Akira Suzuki.

U.S. Appl. No. 11/671,519, filed Feb. 6, 2007, Kunitake et al.

Taro Yoshihama; U.S. Appl. No. 12/055,530, filed Mar. 26, 2008 for "Document Management Apparatus, Document Management System and Method, and Computer-Readable Medium".

Taro Takashima; U.S. Appl. No. 12/112,211, filed Apr. 30, 2008 for "Information Processing Apparatus, Information Processing System, Storage Medium, Information Processing Method, and Data Signal".

Shigehisa Kawabe; U.S. Appl. No. 11/282,022, filed Nov. 17, 2005

(56) References Cited

OTHER PUBLICATIONS for "Document Management Server, Document Management System, Computer Readable Recording Medium, Document Management Method, Client of Document Management System, and Node". Korean Office Action with partial English translation, mailed on Dec. 2, 2008, corresponding to Korean Patent Application No. 10-2007-0058939.

Katsunori Houchi; U.S. Appl. No. 11/939,708, filed Nov. 14, 2007; Information Processing Apparatus, Information Processing System, Information Processing Method, and Computer Readable Storage Medium.

Setsu Kunitake; U.S. Appl. No. 11/942,943, filed Nov. 20, 2007; Information Processing Apparatus, Information Processing System, and Storage Medium.

U.S. Appl. No. 11/839,715, filed Aug. 16, 2007, Masao Nukaga; "Information-Processing Apparatus, Information-Processing System, Information-Processing Method, Computer-Readable Medium, and Computer Data Signal".

US Office Action issued in U.S. Appl. No. 11/942,943 mailed on Jun. 7, 2010.

US Office Action issued in U.S. Appl. No. 11/282,022 mailed on Jul. 6, 2010.

US Office Action issued in U.S. Appl. No. 11/939,708 mailed on Jul. 27, 2010.

U.S. Office Action issued in U.S. Appl. No. 12/112,211 mailed on Aug. 31, 2010.

Tedjini, Mohamed et al. "A Query Service for a Software Engineering Database System," ACM 1990, pp. 238-248.

U.S. Office Action issued in U.S. Appl. No. 11/839,715 mailed on Oct. 7, 2010.

JP Notice of Grounds for Rejection mailed on Aug. 9, 2011, in connection with Japanese Application No. 2006-172736 and English translation.

Japanese Notice of Grounds for Rejection with English translation thereof issued on Dec. 20, 2011 in connection with Japanese Patent Application No. 2007-204891, 5 pages.

Sasaki, S., et al., "Development of a Discussion Board System Designed for the Group Discussion that Includes Peer-Review Process," IPSJ SIG Technical Report, Japan, Information Processing Society of Japan, Apr. 25, 2007, pp. 21-28.

Notice of Grounds for Rejection issued in connection with JP Patent Application Serial No. 2007-096111, mailed on Jan. 31, 2012 and English translation thereof.

U.S. Office Action issued on May 9, 2011, in corresponding U.S. Appl. No. 12/055,530.

Office Action issued on Sep. 7, 2011, in connection with corresponding U.S. Appl. No. 11/942,943.

Office Action of Japanese Patent Application with partial English translation thereof issued on Mar. 27, 2012 in connection with Japanese Patent Application No. 2007-010495.

English translation of Japanese Office Action issued in connection with Japanese Application No. 2005-185934 mailed on Nov. 16, 2010.

Office Action issued in connection with U.S. Appl. No. 11/753,690 mailed on Jan. 3, 2011.

Office Action issued in connection with U.S. Appl. No. 11/942,943 mailed on Apr. 12, 2011.

Japanese Notice of Grounds for Rejection with English translation thereof issued on Jan. 17, 2012 in connection with Japanese Patent Application No. 2007-014482, 6 pages.

Godfrey, Michael W., et al., "Using Origin Analysis to Detect Merging and Splitting of Source Code Entities," IEEE Translations on Software Engineering, vol. 31, No. 2, 2005, 02, pp. 166-181.

Japanese Notice of Grounds for Rejection with English translation thereof issued on Jan. 10, 2012 in connection with Japanese Patent Application No. 2006-327533, 4 pages.

* cited by examiner

| DOCUMENT ID | DOCUMENT FILE |
|:---:|:---:|
| Doc1 | ...... |
| Doc2 | ...... |
| Doc3 | ...... |
| ⋮ | ⋮ |

Fig. 3

| DOCUMENT ID | PARENT ID | OPERATION TYPE | TIME AND DATE |
|:---:|:---:|:---:|:---:|
| Doc1 | NONE | INITIAL REGISTRATION | 2006-11-01T13:45Z |
| Doc2 | Doc1 | UPDATE | 2007-01-04T10:21Z |
| Doc3 | Doc1 | UPDATE | 2007-02-04T11:37Z |
| Doc4 | Doc2 | UPDATE | 2007-03-01T09:00Z |
| ⋮ | ⋮ | ⋮ | ⋮ |

Fig. 4

| OUTPUT DOCUMENT ID | INPUT DOCUMENT ID |
|---|---|
| Doc2 | Doc1 |
| Doc3 | Doc1 |
| ⋮ | ⋮ |

⇩ REGISTER "Doc4"

| OUTPUT DOCUMENT ID | INPUT DOCUMENT ID |
|---|---|
| Doc2 | Doc1 |
| Doc3 | Doc1 |
| Doc4 | Doc1 |
| Doc4 | Doc2 |
| ⋮ | ⋮ |

Fig. 6

| OUTPUT DOCUMENT ID | INPUT DOCUMENT ID |
|---|---|
| Doc2 | Doc1 |
| Doc3 | Doc1 |
| ⋮ | ⋮ |

REGISTER "Doc4"

| OUTPUT DOCUMENT ID | INPUT DOCUMENT ID |
|---|---|
| Doc2 | Doc1 |
| Doc3 | Doc1 |
| Doc4 | Doc2 |
| ⋮ | ⋮ |

Fig. 15

| OPERATION ID | PARENT OPERATION ID | DOCUMENT ID | OPERATION TYPE | OPERATOR | TIME AND DATE |
|---|---|---|---|---|---|
| Ope1 | NONE | Doc1 | INITIAL REGISTRATION | user1 | 2006-11-01T13:45Z |
| Ope2 | Ope1 | Doc1 | VIEWING | user2 | 2007-01-04T10:01Z |
| Ope3 | Ope2 | Doc2 | UPDATE | user2 | 2007-01-04T10:21Z |
| Ope4 | Ope1 | Doc1 | VIEWING | user3 | 2007-01-05T10:33Z |
| Ope5 | Ope4 | Doc3 | UPDATE | user3 | 2007-01-05T10:38Z |
| Ope6 | Ope3 | Doc2 | REFERENCE REQUEST | user1 | 2007-02-04T10:45Z |
| Ope7 | Ope6 | Doc2 | VIEWING | user1 | 2007-02-04T10:45Z |
| Ope8 | Ope7 | Doc4 | UPDATE | user1 | 2007-02-04T10:59Z |
| ... | ... | ... | ... | ... | ... |

Fig. 20

DOCUMENT PROVIDING SYSTEM AND COMPUTER-READABLE STORAGE MEDIUM

CROSS-REFERENCE TO RELATED APPLICATIONS

This application is based on and claims priority under 35 USC 119 from Japanese Patent Application No. 2006-327533 filed on Dec. 4, 2006.

BACKGROUND

1. Technical Field

The present invention relates to a document providing system and a computer-readable storage medium.

2. Related Art

There has been a technology for registering an electronic document such as text document data, audio data, multimedia data, and so on (hereinafter also referred to simply as a "document") in a server and providing the document in response to a user request. Also, a system has been known in which a unique identifier is assigned to an electronic document and an electronic document corresponding to the identifier input by a user is provided. In another known system, when printing an electronic document onto a paper sheet, an identifier of the electronic document is encoded and embedded into the paper document, such that, when the paper document is copied, the identifier embedded therein is recognized, the electronic document corresponding to the identifier is obtained, and then the electronic document information is used to print the paper document.

SUMMARY

According to an aspect of the invention, there is provided a document providing system that has a derivation relationship registration unit that, when receiving an instruction to register a second electronic document that is an updated version of a first electronic document, registers a derivation relationship indicating that the second electronic document is derived from the first electronic document in a derivation relationship storage unit; an input-output relationship registration unit that generates input-output relationship information indicating an updated electronic document to be provided in response to a document request that designates a requested electronic document based on the derivation relationship registered in the derivation relationship storage unit and registers the input-output relationship information in an input-output relationship storage unit; and a providing unit that, when receiving a document request, obtains an updated electronic document corresponding to a requested electronic document designated in the document request based on the input-output relationship information and provides the updated electronic document that is obtained.

BRIEF DESCRIPTION OF THE DRAWINGS

An exemplary embodiment of the present invention will be described in detail based on the following figures, wherein:

FIG. 3 is a view showing example data registered in a document DB;

FIG. 4 is a view showing example data registered in a derivation relationship DB;

FIG. 6 is a view for explaining an example method of generating input-output relation information;

FIG. 15 is a view for explaining example update of the input-output relationship DB by the procedure of FIG. 14;

FIG. 20 is a view schematically showing example derivation relationship information records in a system which records operation IDs;

DETAILED DESCRIPTION

An exemplary embodiment of the present invention will be described in detail with reference to the accompanying drawings.

Figure 1:
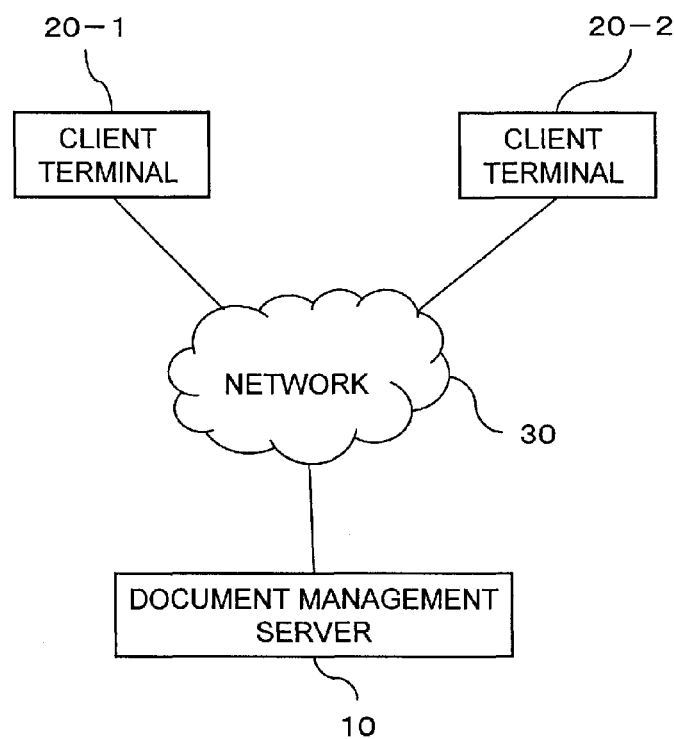
FIG. 1 is a block diagram schematically showing an example structure of a document use management system.

FIG. 1 is a block diagram schematically showing a structure of a document use management system. This system is formed of a document management server 10 and client terminals 20-1, 20-2, . . . (hereinafter collectively referred to a client terminal 20) that are connected to each other via a network 30 such as the Internet, a local area network (LAN), or the like.

In this system, the document management server 10 manages an original file of an electronic document, and provides a reference information file including reference information for accessing the electronic document, rather than the file of the electronic document itself, to the client terminal 20. The reference information included in the reference information file may be any information that allows access to an electronic document. An example of the reference information may include a combination of information indicating the location on the network of the document management server 10 that manages the electronic document (e.g. an IP address) and unique identification information for specifying the electronic document (hereinafter referred to as document ID). Another example of the reference information may be a URL (Uniform Resource Locator) corresponding to the electronic document. If a system which recognizes a storage location of an electronic document based on a document ID exists on the network 30, it is sufficient for the reference information file to include only the document ID. Further, the reference information file may additionally include information other than the reference information described above, such as time and date when the reference information file was created or an image of a representative page of the electronic document. The client terminal 20 stores such a reference information file, in place of an electronic document itself. The reference information file may serve as a so-called shortcut to an electronic document stored in the document management server 10.

In this system, when an electronic document having a certain document ID is updated, the document management server 10 assigns a new document ID to the updated electronic document.

The client terminal 20 includes a document processing program for handling electronic documents based on the reference information file. The document processing program extracts a value of the reference information from the reference information file and performs a predetermined operation with respect to an electronic document corresponding to the extracted value which is managed by the document management server 10. The electronic document operation functions provided by the document processing program include, for example, display (that is, viewing by a user), edition (that is; update of document contents), initial registration, deletion, and so on, of an electronic document. When a user operates the document processing program to designate a reference information file and instruct viewing of an electronic document, for example, the program, using the reference information in the reference information file, recognizes a storage location of the corresponding electronic document and displays the electronic document obtained from the storage location. Here, the document processing program loads the electronic document only on the memory (a virtual memory may be used), and does not store the electronic document in a file system of the client terminal 20.

The document processing program, for example, can display an icon of a reference information file on a screen of the client terminal 20 in advance, and in response to a predetermined operation by a user, such as clicking, with respect to the icon, can transmit a document ID designated by the reference information file corresponding to the icon to the document management server 10. With such an operation, the document ID of an electronic document that is a subject of the user operation is transmitted to the document management server 10.

The client terminal 20 can be any device having an information processing function, and may be a personal computer, a work station, a digital multi-function device, and so on.

In this system, the document management server 10 basically accepts, as an interface for an operation with respect to an electronic document managed by the document management server 10, only an operation via the reference information file. For example, the document management server 10 accepts, as an instruction for an operation with respect to an electronic document, only a specific method issued by the document processing program that treats the reference information file. A user, when attempting to perform an operation with respect to an electronic document, must obtain a reference information file corresponding to the electronic document and instruct the operation with respect to the electronic document by using the reference information on the document processing program. While a user cannot distribute an electronic document itself to others because an electronic document itself is not stored in the client terminal 20, the user can rather copy and distribute a reference information file. Another user, to which the reference information file is distributed, uses the reference information file to thereby access the electronic document on the document management server 10.

Figure 2:
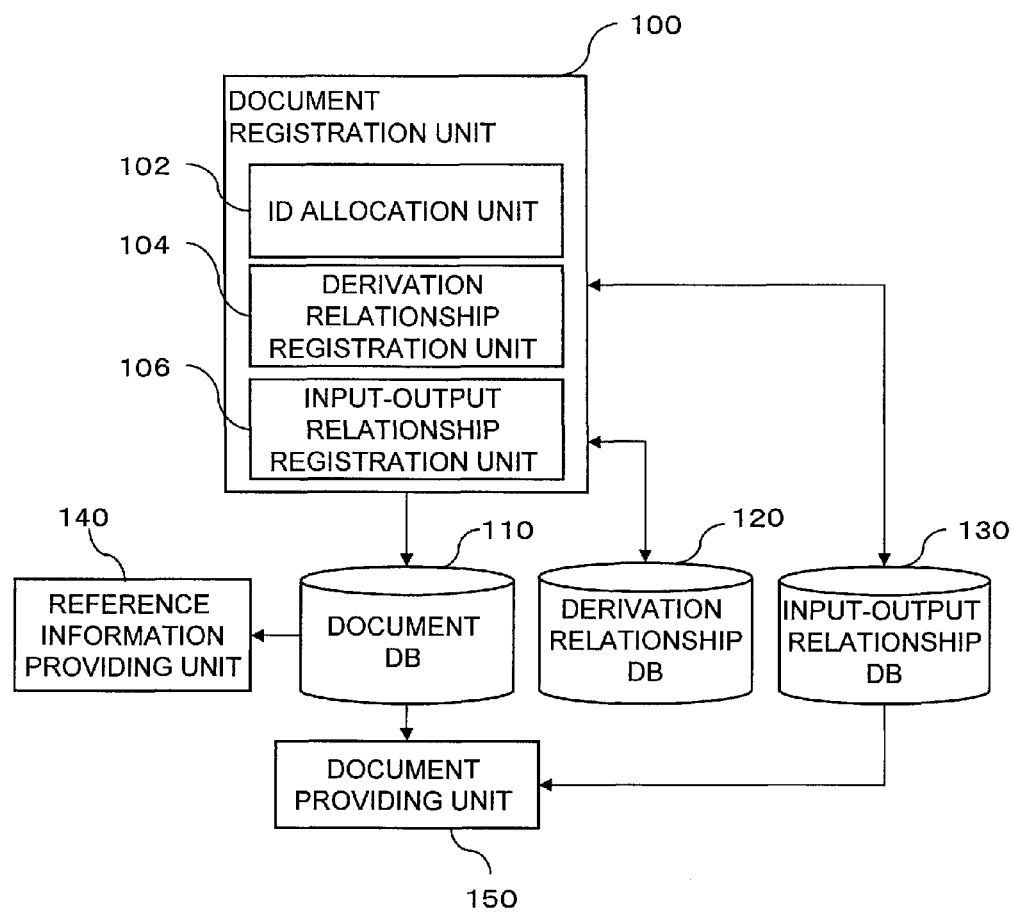
FIG. 2 is a view showing an example internal structure of a document management server.

As shown in FIG. 2, the document management server 10 includes a document registration unit 100, a document database (DB) 110, a derivation relationship DB 120, an input-output relationship DB 130, a reference information providing unit 140, and a document providing unit 150.

The document registration unit 100, in response to a request from the client terminal 20, registers an electronic document in the document DB 110. The registration of an electronic document includes registration of a new electronic document (also referred to simply as "initial registration"), and registration of an updated version of an electronic document that is already registered. In any event, an ID allocation unit 102 allocates a document ID which is unique at least in the document management server 10 to an electronic document to be registered. Here, a hash value of an electronic document, for example, may be used as a document ID. With the use of secure hash algorithms such as SHA-256 and SHA-512, a substantially unique document ID may be generated from an electronic document. However, this method of obtaining the document ID using a hash algorithm is described only as one example. The document registration unit 100 registers an electronic document which is a subject of registration in the document DB 110 in association with a corresponding document ID allocated thereto by the ID allocation unit 102. As shown in FIG. 3, electronic document files are registered in the document DB 110 in association with the corresponding document IDs, respectively.

Further, when registering an electronic document in the document DB 110, a derivation relationship registration unit 104 of the document registration unit 100 registers derivation relationship information concerning the electronic document in the derivation relationship DB 120. The "derivation relationship" as used herein refers to a relationship between an electronic document and an updated version of the electronic document. Specifically, when, as a result of edition of an electronic document A, an electronic document B which is an updated version of the electronic document A is generated, it is considered that "the electronic document B is derived from the electronic document A". From the viewpoint of the derivation relationship, the electronic document A corresponds to a parent of the electronic document B.

In this document use management system, in order to update an electronic document, it is necessary for a user to first obtain the electronic document using the reference information file by the document processing program on the client terminal 20. The document processing program, receiving this instruction, transmits information that specifies the document ID among the information in the reference information file to the document management server 10 to obtain the electronic document corresponding to the document ID. The document processing program then displays the electronic document thus obtained to receive a user's editing operation. Then, when receiving an instruction to register an updated version, the document processing program transmits the information that specifies the document ID of the electronic element and the electronic document that has been edited to the document management server 10 together with an update request. The derivation relationship registration unit 104 of the document management server 10 registers the derivation relationship information in which a new document ID allocated by the ID allocation unit 102 to the electronic document received with the update request is a child and the document ID specified from the information received with the update information is a parent in the derivation relationship DB 120.

Example derivation relationship information registered in the derivation relationship DB 120 is shown in FIG. 4. One row in the table illustrated in FIG. 4 shows a derivation relationship information record corresponding to one electronic document. In the illustrated example, the derivation relationship information record of an electronic document includes a document ID of the electronic document and a document ID of a parent electronic document of the electronic document (indicated as "parent ID" in FIG. 4). With regard to the derivation relationship information, although it is sufficient to simply include information representing a parent-child relationship between electronic documents, in the illustrated example, however, so-called log information items, such as information concerning the type of operations which causes an electronic document to be registered in the document DB 110 (that is, whether it is "initial registration" or "update" of a registered document, for example) or information concerning the time and date of registration, are additionally recorded in the derivation relationship DB 120. Because a parent of an electronic document can be specified, and other log information items, including the time and date of the registration operations of the parent electronic document, are known at the time of registration of the electronic document, these information items are also registered. While the operation type and the operation time and date are described as the log information items, the log information items are not limited to these examples and various information items, such as identification information of a user who instructs an operation and identification information of the client terminal 20 by which the operation is performed can be recorded in conjunction with the object. The derivation relationship information illustrated in FIG. 4 indicates that documents "Doc2" and "Doc3" are derived from a document "Doc1" and that a document "Doc4" is derived from a document "Doc2", which is illustrated in the lower portion of FIG. 5.

The input-output relationship registration unit 106 generates input-output relationship information for specifying an electronic document to be actually provided with respect to an electronic document requested by a user, and registers the input-output relationship information in an input-output relationship DB 130.

In this system, access to an electronic document is basically achieved by using a reference information file corresponding to the electronic document, as described above. In the environments where an electronic document is continuously updated as needed, however, it is more appropriate to provide, rather than an electronic document corresponding to a reference information file owned by a user, an updated version of the electronic document to the user. In order to deal with such environments, the input-output relationship DB 130 is provided in this exemplary embodiment.

Specifically, the input-output relationship information record registered in the input-output relationship DB 130 includes pairs of output document IDs and input document IDs, as shown in FIG. 6. This input-output relationship information record indicates a relationship in which when an electronic document corresponding to an input document ID is required by a user, an electronic document corresponding to an output document ID is to be provided.

The input-output relationship registration unit 106 generates the input-output relationship information record by using the derivation relationship information registered in the derivation relationship DB 120. A variety of methods for generating the input-output relationship information record will be described in detail below.

Referring again to FIG. 2, the reference information providing unit 140 provides a reference information file in response to a request from a user. For example, when a user registers an electronic document in the document management server 10, the reference information providing unit 140 may provide a reference information file indicating a document ID of the electronic document to the user.

Further, the document management server 10 may provide a list display function or a search function (not shown) of the electronic documents registered in the document DB 110 to a user. When a user specifies a desired electronic document by using these functions, a file of the electronic document itself is not provided to the user, and a reference information file corresponding to the electronic document is provided by the reference information providing unit 140.

The document providing unit 150 performs processing for providing an electronic document to a user. Specifically, when a document request using a reference information file is received from the document processing program of the client terminal 20, the document providing unit 150 refers to the input-output relationship DB 130 to specify an electronic document to be provided in response to the request and returns the specified electronic document to the client terminal 20. Here, an electronic document to be provided may be determined in such a manner that, assuming a document ID of an electronic document requested by the document request is an input document ID, an output document ID corresponding to this input document ID is obtained from the input-output relationship DB 130.

In the above-described example, the document management server 10 including three databases, that is, the document DB 110, the derivation relationship DB 120, and the input-output relationship DB 130, has been described only for the sake of convenience. However, any database structure may be adopted as long as the data contents managed by these three databases can be managed as a whole. For example, the document DB 110 and the derivation relationship DB 120 may be combined into a single database.

Processing performed by the document management server 10 will next be described.

Figure 7:
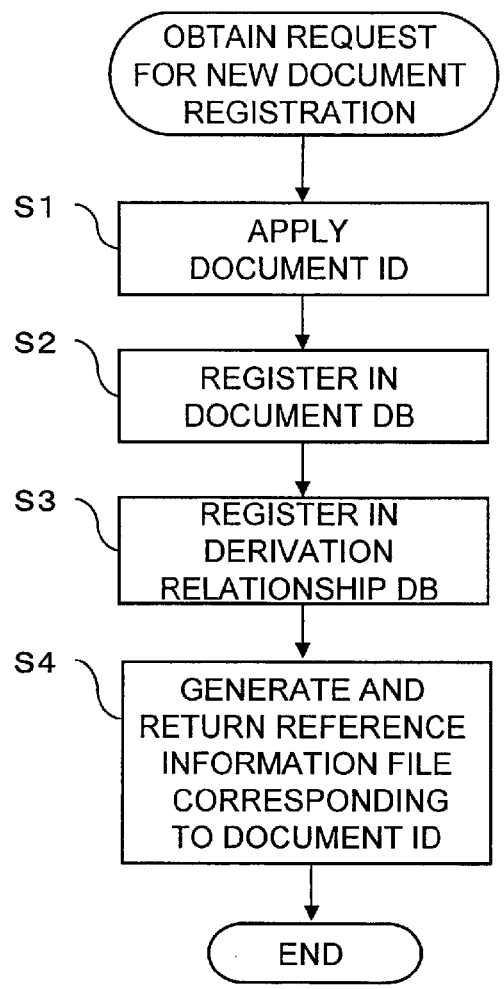
FIG. 7 is a flowchart showing an example procedure of initial registration of a document.

First, referring to FIG. 7, example processing performed by the document registration unit 100 when receiving a registration request of a new document (initial registration request) from the client terminal 20 will be described. The document processing program of the client terminal 20, receiving a registration instruction of an electronic document from a user, transmits the electronic document together with a request for initial document registration to the document management server 10. The document registration unit 100 of the document management server 10, receiving this request, allocates a unique document ID to the received electronic document by the ID allocation unit 102 (S1), and registers the electronic document in association with the document ID in the document DB 10 (S2). The document registration unit 100 further generates a derivation relationship information record concerning the registered electronic document and registers the derivation relationship information in the derivation relationship DB 120 (S3). Here, in a case of initial document registration, in contrast to an updating of an electronic document that is already registered, no parent electronic document exists for the registered electronic document. Accordingly, the derivation relationship information record generated in this case includes no value, that is, "none", for the parent ID in the derivation relationship, as in the case of the record concerning "Doc1" in the table shown in FIG. 4, for example. Once registration is completed, the reference information providing unit 140 generates a reference information file indicating the allocated document ID and provides the reference information file to the client terminal 20 (S4). The user can now obtain the electronic document that is registered by using the reference information file. Further, the reference information file can be copied and distributed.

Figure 8:
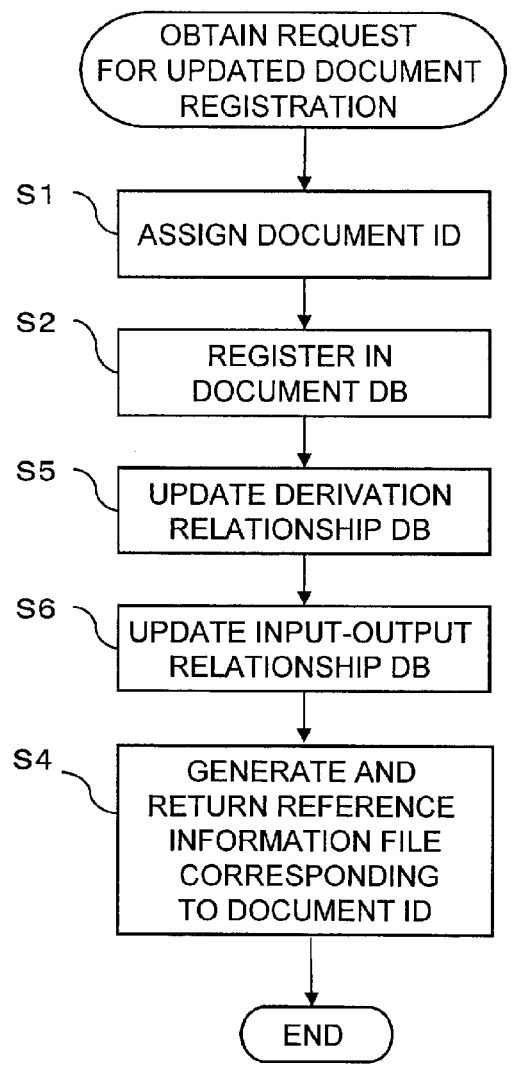
FIG. 8 is a flowchart showing an example procedure of registration of an updated document.

Referring now to FIG. 8, example processing performed by the document registration unit 100 when receiving a registration request of an updated version of an electronic document will be described.

When updating an electronic document, a user operates the document processing program of the client terminal 20 to obtain the electronic document to be updated by using a reference information file and to open the electronic document so as to perform an editing operation. When the editing operation is completed and then the user inputs an instruction to register the electronic document thus edited (that is, an updated version of the electronic document), the document processing program transmits an updated document registration request to the document management server 10. This updated document registration request includes information for specifying a document ID of the electronic document that is the subject of the update and the electronic document that is edited. Here, because the document processing program has a reference information file of the electronic document that is a subject of update the document processing program can obtain the information for specifying the document ID of the electronic document that is a subject of update.

Figure 9:
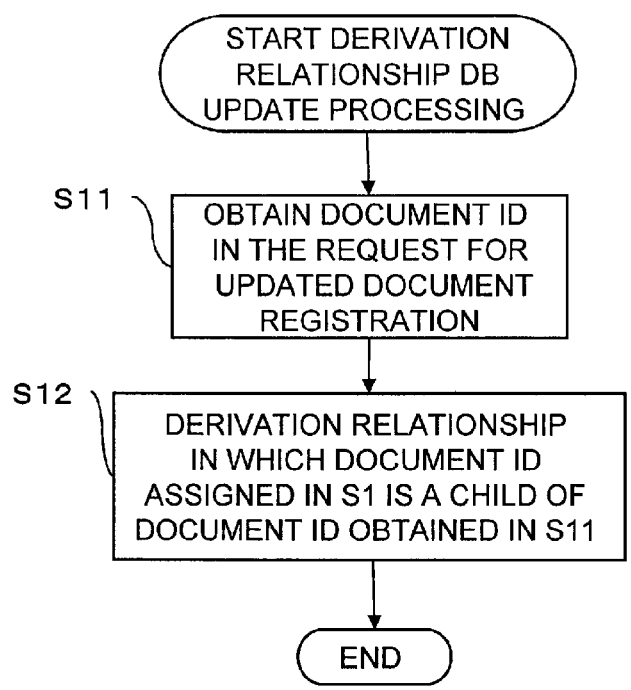
FIG. 9 is a flowchart showing an example update procedure of a derivation relationship DB.

The document registration unit 100 of the document management server 10, receiving an updated document registration request from the client terminal 20, allocates a new document ID to the updated electronic document that is received (S1) and registers the updated electronic document in the document DB 10 (S2). Further, the derivation relationship registration unit 104 updates the derivation relationship DB 120 in accordance with the registration (S5). The processing in this step S5 is shown in detail in FIG. 9. Specifically, in this processing, the document registration unit 100 first obtains the document ID of the electronic document that is a subject of update indicated by the updated document registration request from the client terminal 20 (S11). The document registration unit 100 then generates a derivation relationship information record in which the document ID allocated to the updated electronic document in step S1 is a child document ID and the document ID obtained in step S11 is a parent document ID, and registers the derivation relationship information record in the derivation relationship DB 120 (S12). Here, the derivation relationship information record includes the log items including the operation type and the time and date corresponding to this request.

Figure 10:
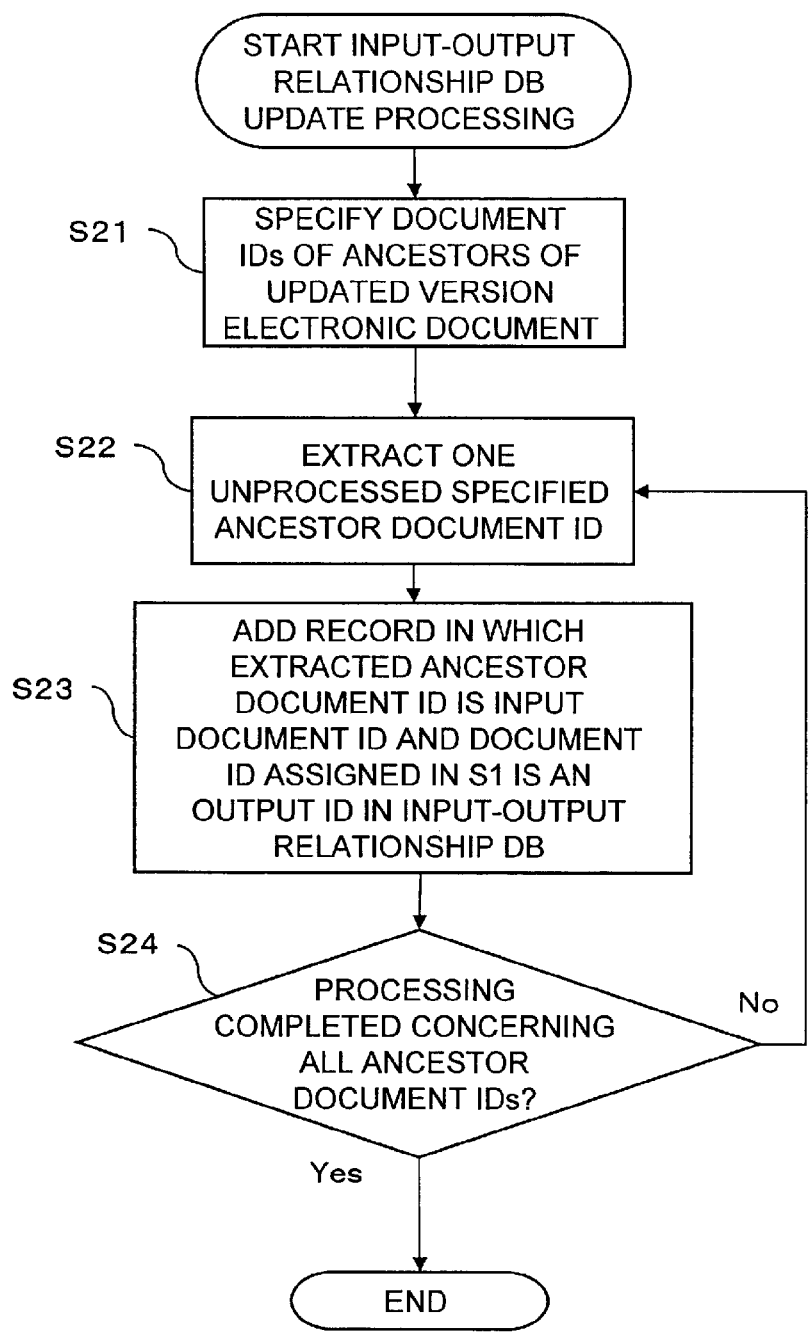
FIG. 10 is a flowchart showing an example update procedure of an input-output relationship DB.

Referring again to FIG. 8 the input-output relationship registration unit 106 updates the input-output relationship DB 130 in accordance with the registration of the updated electronic document of various possible methods for updating the input-output relationship DB 130, an example of the method shown in FIG. 10 will be first described.

In the procedure shown in FIG. 10, the input-output relationship registration unit 106 refers to the derivation relationship DB 120 to specify the document IDs of ancestor electronic documents of the updated electronic document which is registered in accordance with the updated document registration request (S21). The term "ancestor" as used herein refers to an earlier document which appears as an ancestor in the tree structure of the derivation relationship (see FIG. 5, for example) formed by the derivation relationship information records registered in the derivation relationship DB 120. The ancestor electronic documents of the updated electronic document can be specified by sequentially tracing back the derivation relationship to a parent of the updated electronic document, a parent of the parent, and so on, in the derivation relationship DB 120. The input-output relationship registration unit 106 then selects one of the ancestor electronic documents (S22), and further generates an input-output relationship information record in which the document ID of the selected electronic document is designated as an input document ID and the document ID allocated to the updated electronic document in step S1 is designated as an output ID, and registers the input-output relationship information record in the input-output relationship DB 130 (S23). The input-output relationship registration unit 106 repeats the steps S22 and S23 described above with regard do all the ancestor electronic documents specified in step S21.

Figure 5:
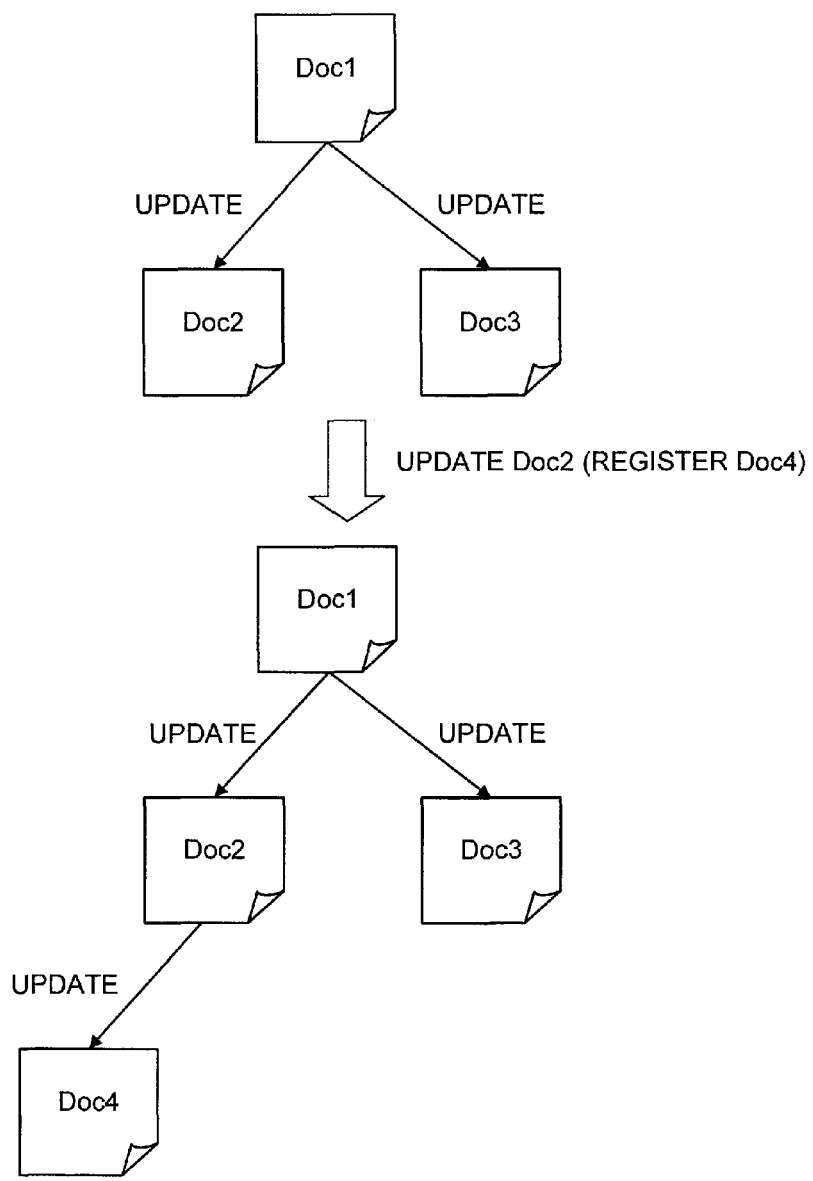
FIG. 5 is a view showing an example change of the derivation relationship caused by update of a document.

For example, when, in a situation where the electronic documents "Doc1", "Doc2", and "Doc3" constituting the derivation relationship shown in the upper portion of FIG. 5 are registered in the document DB 110, the input-output relationship information record in which an input document ID "Doc1" is associated with an output document ID "Doc2" and the input-output relationship information record in which the input document ID "Doc1" is associated with an output document ID "Doc3" are registered in the input-output relationship DB 130, as shown in the table in the upper portion of FIG. 6. In such a situation, when the document "Doc1" is requested from a user, the document management server 10 provides the electronic document "Doc2" or "Doc3" to the user. Here, if an electronic document "Doc4" which is an updated result of the electronic document "Doc2" is registered in the document management server 10 in this situation, the tree structure of the derivation relationship changes to that shown in the lower portion of FIG. 5. In this case, according to the procedure shown in FIG. 10, an input-output relationship information record in which "Doc4" is an output document ID and "Doc2" and "Doc1" corresponding to the ancestors of "Doc4" are input document IDs is added to the input-output relationship DB 130. Consequently, the data content of the input-output relationship DB 130 is changed to the data content shown in the table in the lower portion of FIG. 6. In this state, when the electronic document "Doc1" is requested by a user, the document management server 10 provides the electronic document "Doc2", "Doc3", or "Doc4" to the user.

Figure 11:
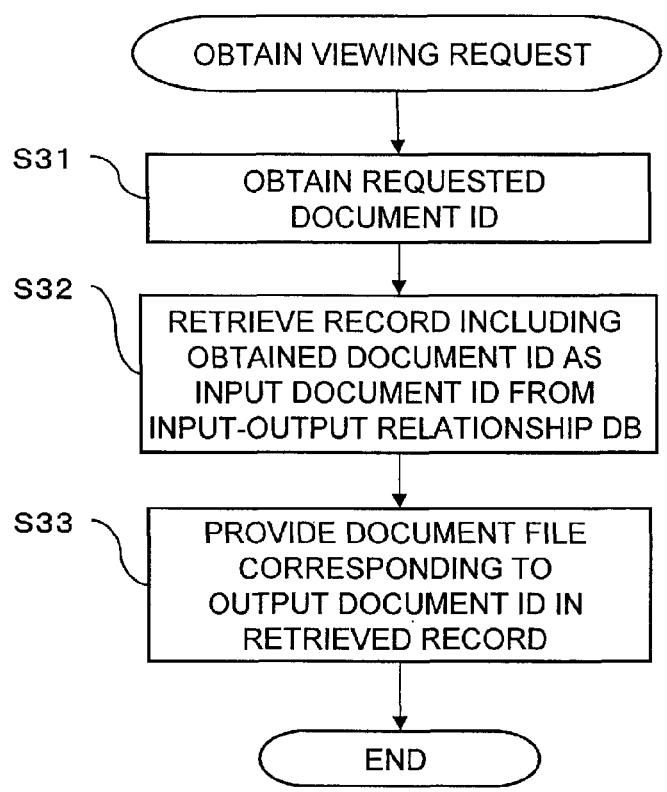
FIG. 11 is a flowchart showing an example procedure of document provision.

Referring to FIG. 11, the procedure of processing preformed by the document providing unit 150 will be described. The document providing unit 150, receiving a viewing request of an electronic document from the document processing program on the client terminal 20, obtains, from the request, the document ID of the electronic document that is a subject of the request (S31). The document proving unit 150 then retrieves an input-output relationship information record including the document ID that is obtained as an input document ID from the input-output relationship DB 130 (S32), and extracts a file of the electronic document indicated by the output document ID in the retrieved record from the document DB 110 and provides the file to the client terminal 20 (S33). In a case wherein the input-output relationship DB 130 includes the records as shown in the table in the lower portion of FIG. 6, when a request for viewing the electronic document "Doc2" is received from the client terminal 20, the document providing unit 150 refers to the input-output relationship DB 130 to find that the input document ID "Doc2" corresponds to the output document ID "Doc4" and retrieves an electronic document whose document ID is "Doc4" from the document DB 110 and provides the document to the client terminal 20.

In the procedure shown in FIG. 11, when a user requests a document by using a reference information file of an older version of an electronic document, an electronic document file of the updated version corresponding to the older version is provided. However, it is also possible to provide a reference information file indicating the updated version electronic document rather than providing the updated version electronic document.

Figure 12:
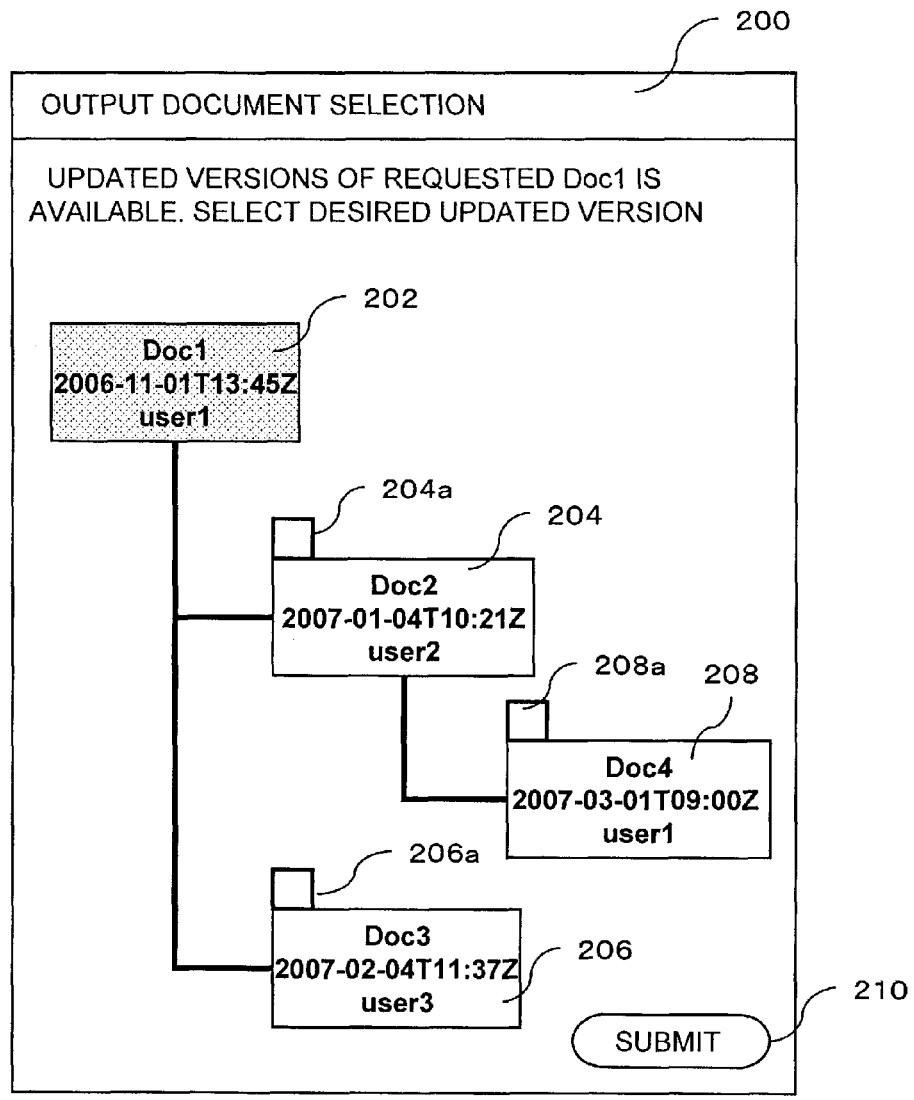
FIG. 12 is a view showing an example output document selection screen provided to a user when plural output document IDs exist corresponding to an input document ID.

Here, when the electronic document "Doc1" is a subject of a viewing request, in the example shown in the table in the lower portion of FIG. 6, the corresponding output document ID is "Doc2", "Doc3", or "Doc4". When plural output document IDs correspond to the requested electronic document, the document providing unit 150 may provide a user interface to the client terminal 20 such that the user can select a desired output document ID from the plural output document IDs. This interface includes a screen for displaying a tree structure that represents the derivation relationship between the document ID of an electronic document requested by the user and plural corresponding output document IDs, an example of which is shown in FIG. 12. Specifically, a selection screen 200 illustrated in FIG. 12 shows a tree structure of the derivation relationship including an icon 202 of the requested electronic document "Doc1" and icons 204, 206, and 208 of the corresponding output document IDs "Doc2", "Doc3", and "Doc4", respectively. The tree structure of the derivation relationship may be created by referring to the derivation relationship DB 120. In the example shown in FIG. 12, each icon 202, 204, 206, or 208 of the corresponding electronic document includes a document ID, the time and date of registration, and a user ID of a user who registered the document, as information for identifying each electronic document. Such a display can be created from the log information items registered in the derivation relationship DB 120. Here, the items displayed in each icon are not limited to those described above. Check boxes 204a, 206a, and 208a are attached to the icons 202, 204, 206, and 208, respectively. The document processing program of the client terminal 20 displays this output document selection screen 200 for receiving user selections of a desired electronic document. When the user selects the check box of the desired electronic document and presses or clicks a send button 210, the document processing program sends the document ID of the electronic document which is selected to the document providing unit 150 of the document management server 10. The document providing unit 150, receiving the selected document ID, returns a file of the electronic document corresponding to the document ID to the document processing program. The selection screen 200 may be provided in the form of a web page, and selection of an electronic document on the selection screen may be received by using existing input technologies such as a mouse and a touch panel.

Further, when no input-output relationship records including the document ID of an electronic document that is requested as an input document ID exists in the input-output relationship DB 130, the document providing unit 150 extracts an electronic document corresponding to the requested document ID and provides the electronic document to the client terminal 20. For example, when an updated version of the electronic document which is requested has not been registered, such a processing will be performed. Here, in place of such a processing, the following processing may also be performed. Specifically, when an electronic document is registered in the document management server 10, the derivation relationship registration unit 106 may create a derivation relationship record in which both the input document ID and the output document ID are the same document ID which is allocated to the electronic document and register the derivation relationship record in the derivation relationship DB 120.

In the system according to the exemplary embodiment described above, a user having a reference information file corresponding to an original version of an electronic document is automatically authorized to obtain an updated version of the electronic document.

Figure 13:
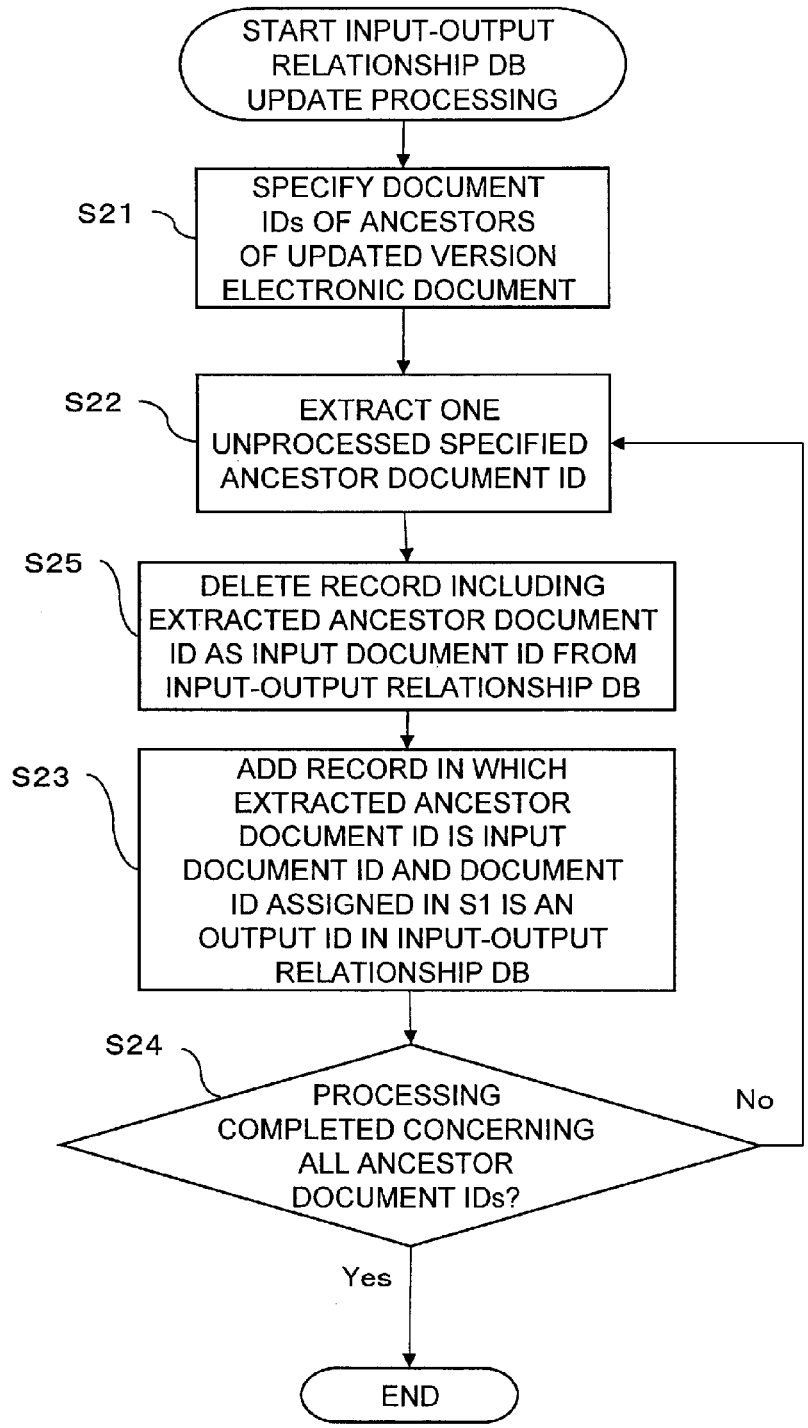
FIG. 13 is a flowchart showing an example update procedure of an input-output relationship DB.

Referring now to FIG. 13, an example modification of the processing performed by the input-output relationship registration unit 106 will be described. In the processing procedure shown in FIG. 13, after step S22, the input-output relationship information records each having, as an input document ID value, the document ID of the specified ancestor of the updated version electronic document are deleted from the input-output relationship DB 130 (S25). Then, the input-output relationship registration unit 106 generates an input-output relationship information record in which the document ID of the ancestor is an input document ID and the document ID allocated to the updated electronic document is an output ID and registers the information in the input-output relationship DB 130 (S23). In this example modification, when an updated version of an electronic document is registered in the document management server 10, the document management server 10 always provides the updated version in response to a request for each older version corresponding to the ancestor of the updated version. As such, in this example modification, a user having a reference information file corresponding to an older version of an electronic document can obtain the latest version of the electronic document corresponding to the older version.

Figure 14:
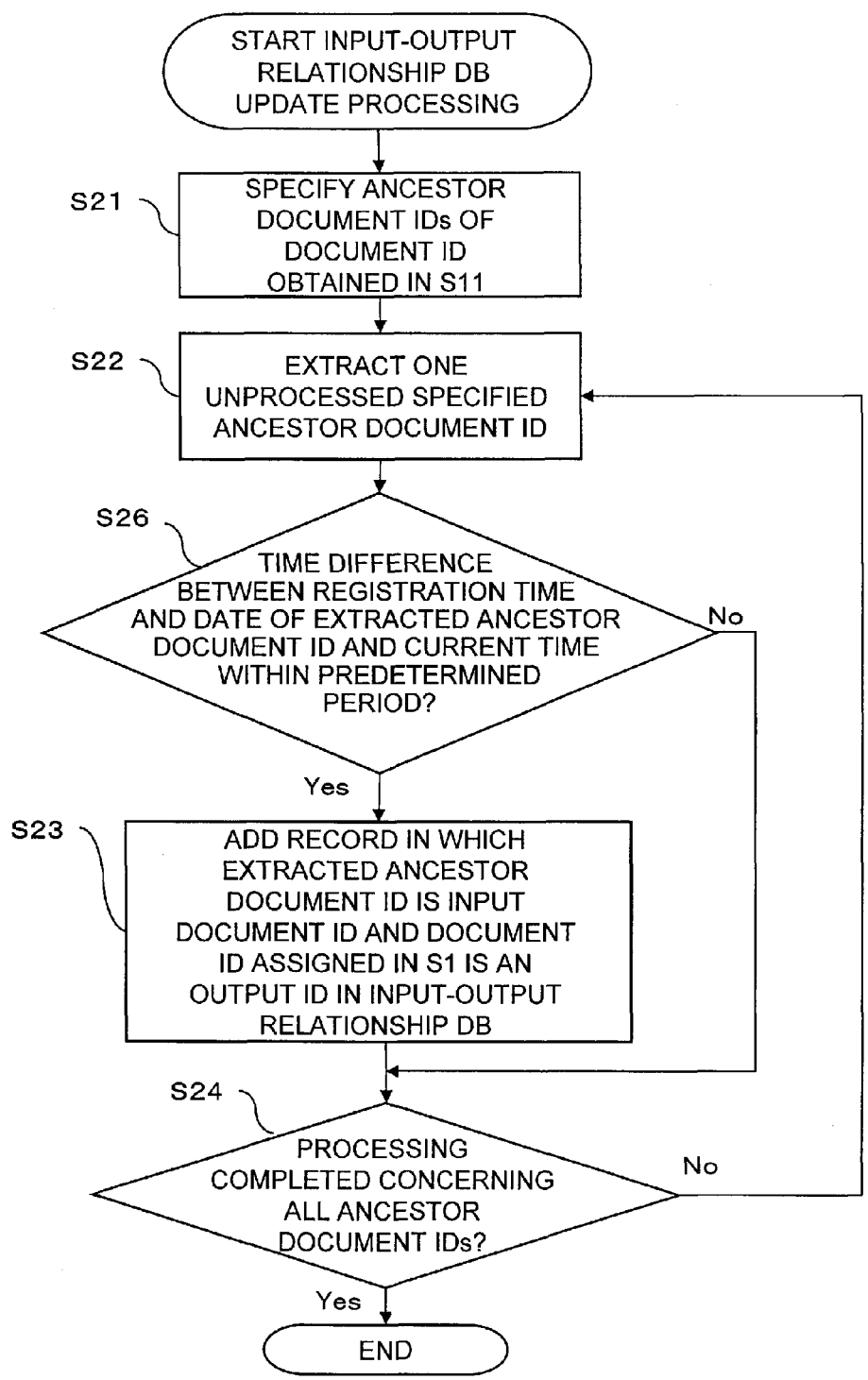
FIG. 14 is a flowchart showing another example update procedure of the input-output relationship DB.

Referring further to FIGS. 14 and 15, another example modification of the processing performed by the input-output relationship registration unit 106 will be described. In the processing procedure shown in FIG. 14, the input-output relationship registration unit 106 determines whether or not a time difference between the time and date when the electronic document corresponding to the ancestor document ID extracted in step S22 was registered in the document management server 10 (which information can be obtained from the derivation relationship DB 120) and the current time is within a predetermined threshold period registered in the document management server 10 (S26). Then, if the time difference is determined to fall within the threshold period, the input-output relationship registration unit 106 creates an input-output relationship information record in which the document ID of the ancestor is an input document ID and the document ID allocated to the updated version of the electronic document is an output document ID, and registers the information in the input-output relationship DB 130 (S23). If the time difference is determined to exceed the threshold period, on the other hand, the processing proceeds to step S24, without performing the processing step S23.

For example, it is assumed that the data content of the derivation relationship DB 120 when the electronic document "Doc4" is registered is as shown in FIG. 4 and that the value of the threshold period registered in the document management server 10 is "60 days". In such a case, when the processing is performed in accordance with the procedure shown in FIG. 14, the data content of the input-output relationship DB 130, which was in the state shown in the table in the upper portion of FIG. 15 before registration of the electronic document "Doc4" (which is the same state as that shown in the table in the upper portion of FIG. 6), is changed to the state shown in the table in the lower portion of FIG. 15 after the registration. Because the registration time and date of the electronic document "Doc1", which is one of the ancestors of the electronic document "Doc4", has a time difference exceeding 60 days with respect to the registration time and date of the electronic document "Doc4", the input-output relationship information record in which the document ID "Doc1" is an input document ID and the document ID "Doc4" is an output document ID is not registered in the input-output relationship DB 130 in the procedure of FIG. 14.

As described above, in the modified example shown in FIG. 14, when a reference information file corresponds to an ancestor of the registered updated version of an electronic document whose registration date is earlier than the current date by a period exceeding the threshold period, a user having such a reference information file is not authorized to obtain the updated version.

Figure 16:
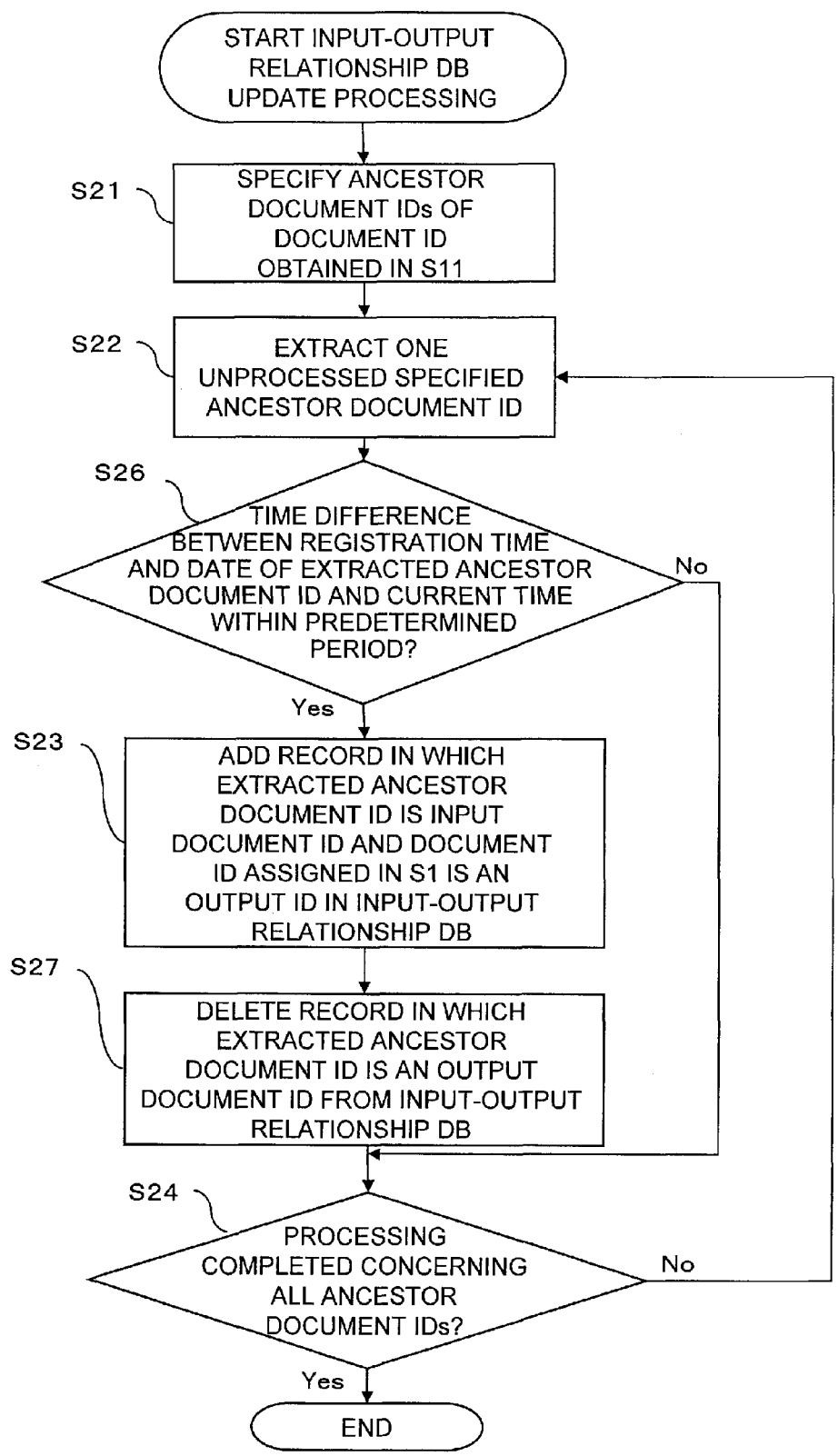
FIG. 16 is a flowchart showing still another example update procedure of the input-output relationship DB.

Referring further to FIG. 16, a still further example modification of the processing performed by the input-output relationship registration unit 106 will be described. In the processing procedure shown in FIG. 16, step S27 is further added between steps S23 and S24 in the procedure of FIG. 14. In this procedure, the input-output relationship registration unit 106, after completion of the processing in step S23 for registering an input-output relationship information record in which the document ID of the updated version is an output document ID and the document ID of an ancestor of the updated version is an input document ID in the input-output relationship DB 130, deletes a record including the document ID of the ancestor as a value of the output document ID (S27).

An example of the procedure shown in FIG. 16 will be described using an example case shown in FIGS. 4 and 15. Specifically, in the procedure shown in FIG. 16, when the electronic document "Doc4" is registered in the document management server 10, the input-output relationship registration unit 106 registers an input-output relationship information record including "Doc2" as an input document ID and including "Doc4" as an output document ID in the input-output relationship DB 130 and also deletes a record including "Doc2" as an output document ID (corresponding to the record at the top row in the table shown in the lower portion of FIG. 15) from the input-output relationship DB 130. This prevents the document management server 10 from providing the electronic document "Doc2" or the corresponding reference information file in response to a request using a reference information file corresponding to the document ID "Doc1". Consequently, it is possible to prohibit a user having a reference information file corresponding to "Doc1" which is of too old version from obtaining its updated version "Doc2" and then obtaining the latest version "Doc4" through the authorization of "Doc2".

Figure 17:
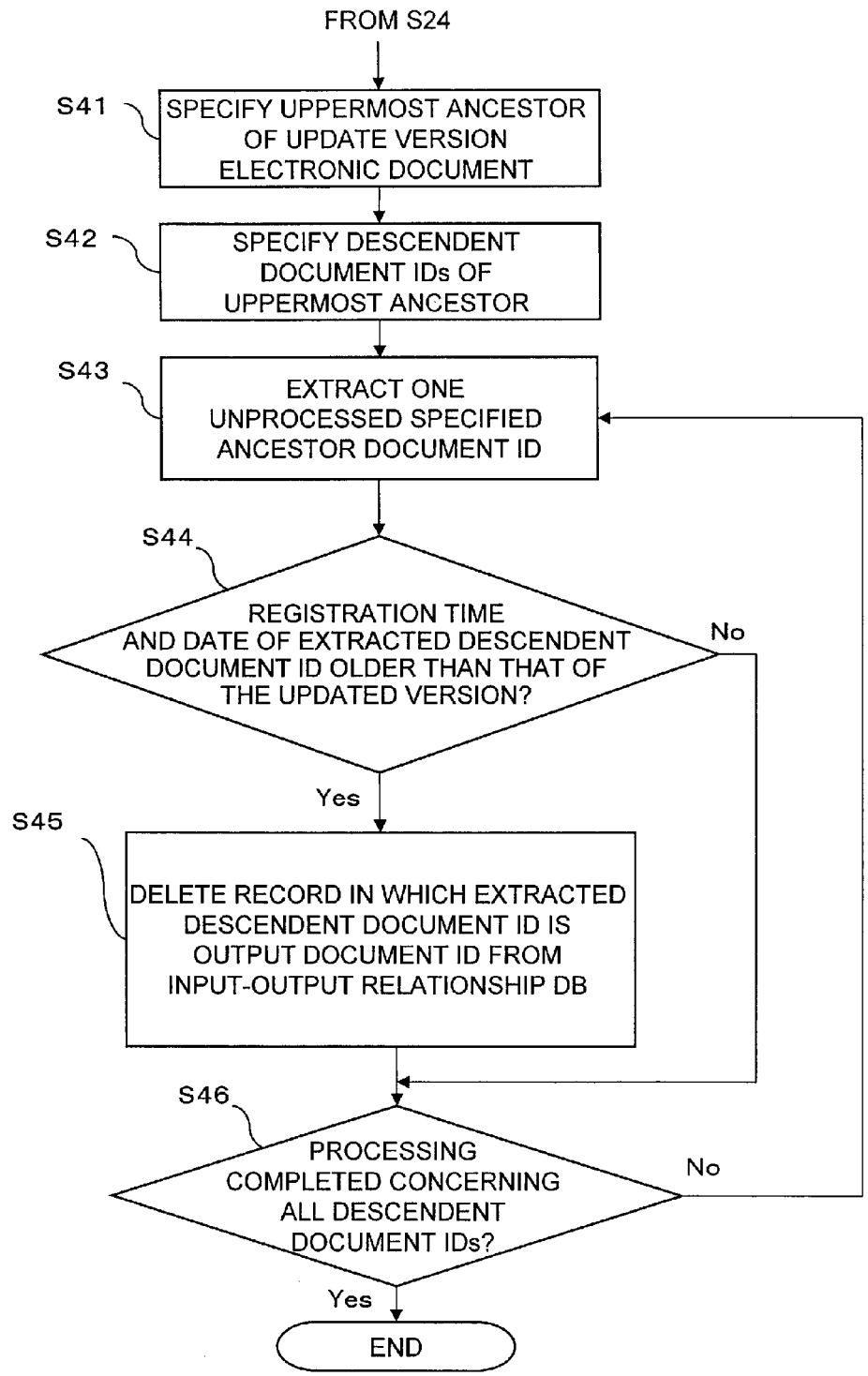
FIG. 17 is a flowchart showing yet another example update procedure of the input-output relationship DB.

Referring further to FIG. 17, a further example modification of the processing performed by the input-output relationship registration unit 106 will be described. This example modification, similar to the example modification shown in FIG. 15, prevents creation of a loophole that would allow a user from obtaining the latest version through the use of a reference information file corresponding to a too old version via the intervening versions. The procedure in this example modification up to step S24 may be similar to that shown in FIG. 10 or FIG. 14. The procedure shown in FIG. 17 is performed when the determination result in step S24 is affirmative (Yes). Specifically, the input-output relationship registration unit 106 traces the derivation relationship from the updated version of an electronic document registered in the document DB 110 to specify the document ID of an ancestor at the uppermost level (S41) and then specify the document IDs of all the descendents of the uppermost ancestor (S42). The processings in steps S41 and S42 are performed with reference to the derivation relationship DB 120. The input-output relationship registration unit 106 then extracts one of the specified document IDs of: the descendents which has not been subjected to the processing in step S44 (S43), and determines whether or not the registration time and date of the document ID of the descendent which is extracted is older than that of the updated version of the electronic document (S44). If the registration time and date of the extracted descendent is determined to be older than that of the updated version, the input-output relationship registration unit 106 deletes an input-output relationship record which includes the document ID of the descendent as an output document ID from the input-output relationship DB 130 (S45), and the processing proceeds to step S46. If the registration time and date is not determined to be older, the processing skips step 45 and proceeds to step S46. The processings in steps S43 to S45 described above will be repeated with regard to each of the document IDs of the descendents specified in step S42 (S46).

In the case of the example shown in FIGS. 4 and 15, according to the procedure in FIG. 17, when the updated electronic document "Doc4" is registered, the input-output relationship registration unit 106 specifies "Doc1" which is the uppermost ancestor, and then specifies "Doc2", "Doc3", and "Doc4" as descendents of "Doc1". Because the registration time and date of "Doc2" and "Doc3", among these descendents, is older than the registration time and date of the updated version "Doc4", the input-output relationship registration unit 106 deletes both an input-output relationship record in which "Doc2" is an output document ID and an input-output relationship record in which "Doc3" is an output document ID, that is, the records at the top and the second top in the table shown in the lower portion of FIG. 15, from the input-output relationship DB 130.

Figure 18:
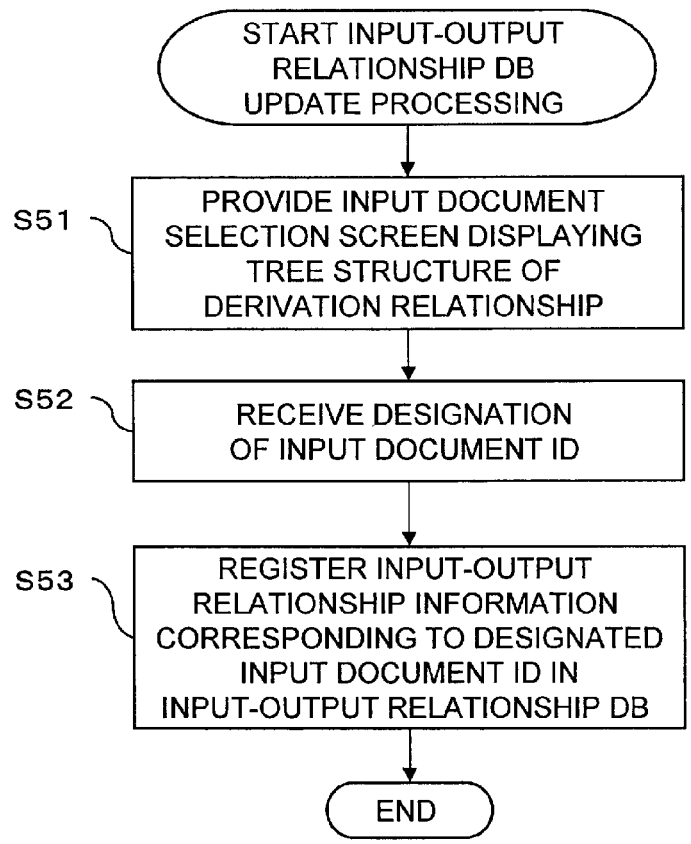
FIG. 18 is a flowchart showing a further example update procedure of the input-output relationship DB.
Figure 19:
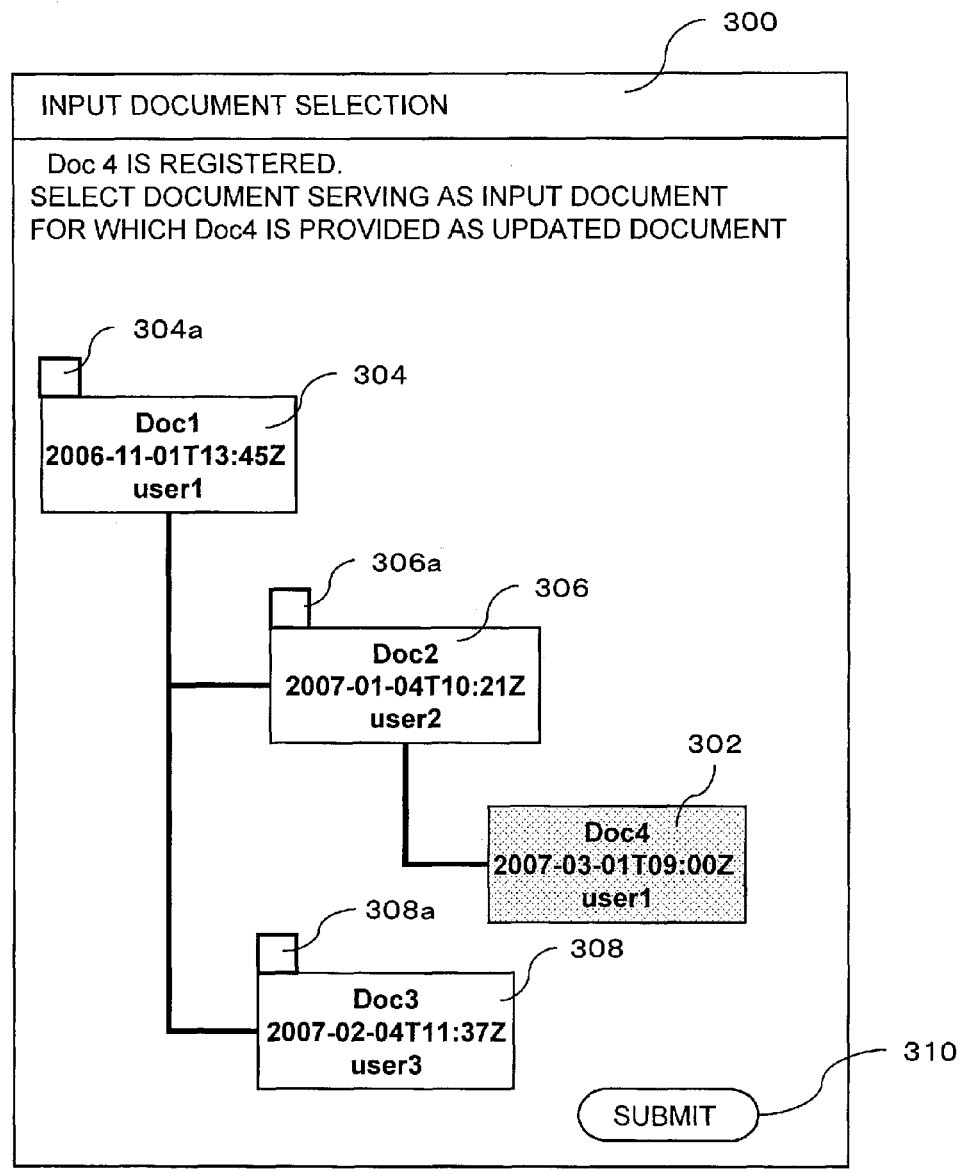
FIG. 19 is a view showing an example input document selection screen provided to a user during the procedure of FIG. 18.

Referring further to FIGS. 18 and 19, a still further example modification of the processing performed by the input-output relationship registration unit 106 will be described. While in the above-described examples the input-output relationship registration unit 106 automatically adds an input-output relationship information record, in this example modification, a user is allowed to designate the input-output relationship to be added.

In the procedure shown in FIG. 18, when an updated version of an electronic document is registered in the document DB 110 in response to a request from the client terminal 20, the input-output relationship registration unit 106 generates an input document selection screen showing a tree structure of the derivation relationship including the updated version, and provides the selection screen to the client terminal 20 (S51). The tree structure of the derivation relationship displayed on the input document selection screen includes the updated version of the electronic document and each ancestor of the updated version. Further, the tree structure may include not only the ancestors of the updated version but also descendents derived from the ancestors.

An example of the input document selection screen 300 is shown in FIG. 19. The input document selection screen 300 displays an icon 302 of an updated version of an electronic document "Doc4" which is newly registered, icons 304 and 306 corresponding to the document IDs "Doc1" and "Doc2", respectively, which are ancestors of "Doc4", and an icon 308 corresponding to the document ID "Doc3" which is a descendent of the ancestor "Doc1". As in the example shown in FIG. 12, each icon 302 to 308 may indicate the attribute information items for identifying each corresponding electronic document. In this screen 300, the tree structure of the derivation relationship among the document IDs is represented by lines connecting the icons 302 to 308. The derivation relationship illustrated in FIG. 19 corresponds to the derivation relationship information records illustrated in FIG. 4. In this example, a user is allowed to select, among the document IDs "Doc1", "Doc2", and "Doc3" corresponding to the documents which are ancestors of the electronic document "Doc4" and also a descendent of the ancestor, a document to which authorization of the electronic document "Doc4" is applied, that is, a document whose document ID can be an input document ID in the input-output relationship information record. Here, the icon 302 of the updated version of the electronic document may be displayed in a display mode different from that of other icons 304 to 308 (in a different color or a different shape, for example). In order to allow a user to select an input document ID, check boxes 304*a*, 306*a*, and 308*a* are attached to the icons 304, 306, and 308, respectively. The document processing program of the client terminal 20 displays this input document selection screen 300 and receives user's selection of a desired document ID. When a user selects the check box of a desired document ID and presses or clicks a send button 310, the document processing program transmits the document ID which is selected to the input-output relationship registration unit 106 of the document management server 10. The input-output relationship registration unit 106 receives the selected document ID (S52), and generates and registers in the input-output relationship DB 130 an input-output relationship information record including the selected document ID as an input document ID and the document ID of the updated version of the electronic document 302 as an output document ID.

While in the example shown in FIG. 19 a population from which an input document ID is drawn includes not only ancestors of an updated version electronic document but also descendents derived from the ancestors, the population may include only ancestors.

In the example modification shown in FIGS. 18 and 19, because information concerning the derivation relationship of electronic documents relevant to an updated version of an electronic document, such as ancestors of the updated version, is provided to a user, the user can select an input document ID corresponding to the updated version of the electronic document with reference to the derivation relationship.

In the exemplary embodiment and the example modifications described above, a reference information file indicating a document ID of an electronic document is provided to the client terminal 20 and is stored by the client terminal 20 in place of the electronic document itself. Such an information file is, however, only one example. Alternatively, it is also possible to issue an operation ID which uniquely identifies an operation performed with respect to an electronic document in the document management server 10 in accordance with an instruction from the client terminal 20 each time such an operation is performed, and to provide a reference information file indicating the operation ID to the client terminal 20. The operations performed with respect to an electronic document includes various kinds of operations, such as, for example, initial registration of an electronic document, registration of an updated version of an already registered electronic document, viewing of an electronic document, requesting a reference information file necessary for viewing of an electronic document, and the like. In the case of initial registration of an electronic document, the document management server 10 assigns a document ID to the electronic document and registers the document ID in the document DB 110, while simultaneously assigning an operation ID to the operation of initial registration and generates and stores a log information record including a correspondence between the document ID and the operation ID. The log information record may include log items such as a type of operation (that is, "initial registration" in this example), an ID of an operator who instructs the operation, time and date when the operation is performed, and the like.

Here, operations other than the initial registration of an electronic document are performed by using a reference information file, and can therefore be regarded as operations derived from the operation ID included in the corresponding reference information file. Stated in another manner, an operation ID stored in the reference information file which is used for performing such an operation can be regarded as an ID of a parent operation of such an operation. It is therefore possible to record the ID of the parent operation in the log information record. Because the relationship between the target operation ID and the parent operation ID recorded in the log information record corresponds to a derivation relationship between the operations, such a log information record may be stored in the derivation relationship DB 120 as a record of the derivation relationship.

Example log information records recorded in the document management server 10 in this method are shown in FIG. 20. The records illustrated in FIG. 20 include, for each operation, an operation ID of the operation, a parent operation ID, a document ID of a document which is a target of the operation, the operation type, and other log items. The derivation relationship among the operations indicated by the log information records shown in FIG. 20 is schematically illustrated in FIG. 21.

When a user performs initial registration of an electronic document, a reference information file including an operation ID assigned to the registration operation is provided to the user. Then, when the user or any user who has acquired the reference information file from the user instructs an operation with respect to the electronic document by using the reference information file, the operation ID indicated by the reference information file is transmitted from the client terminal 20 to the document management server 10. The document management server 10 performs the operation instructed by the client terminal 20, allocates a new operation ID to the operation, and returns the reference information file including the new operation ID to the client terminal 20. The client terminal 20 replaces the reference information file that was used for instructing the operation with the reference information file newly received. Further, the document management server 10 records a log information record (a derivation relationship information record) corresponding to the operation which was performed.

Figure 21:
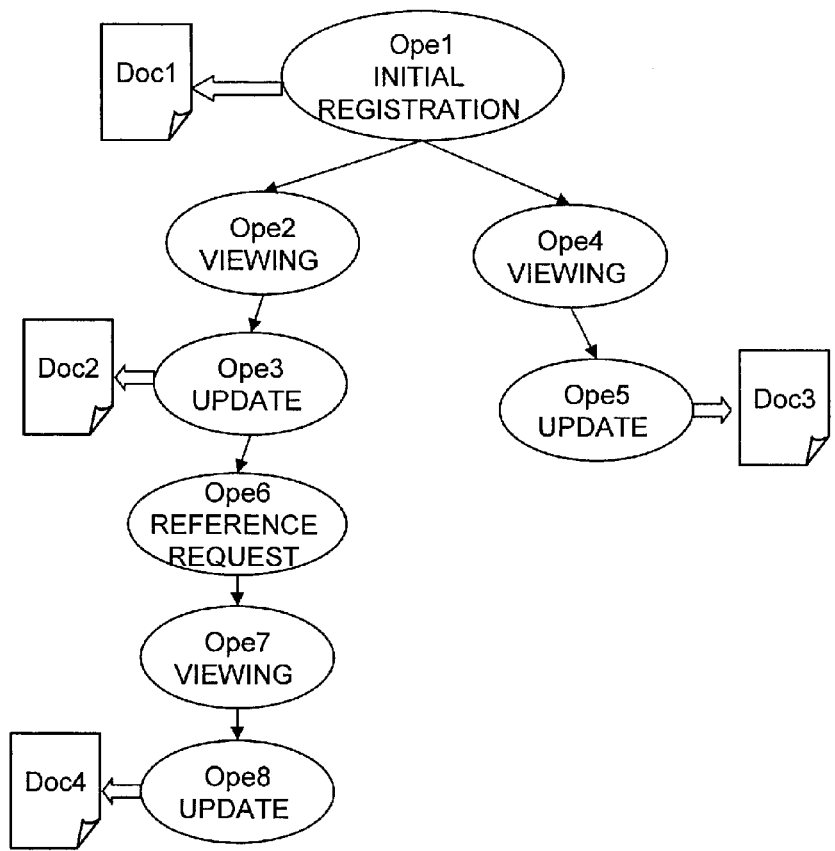
FIG. 21 is a view schematically showing the derivation relationship between the operation IDs indicated by the records in FIG. 20.

The example shown in FIGS. 20 and 21 indicates, for example, that an operator "user1" initially registers a document "Doc1" in the document management server 10 by means of an operation "Ope1". Another operator "user2" then acquires a reference information file including the operation ID "Ope1" issued by the document server 10 at the time of initial registration from the operator "user1" and uses the reference information file to view the document "Doc1". As a result of this viewing, the reference information file owned by the operator "user2" is replaced with a reference information file including the operation ID "Ope2" corresponding to the viewing. The operator "user2" uses the reference information file including the operation ID "Ope2" to update the document "Doc1", and registers the updated version "Doc2" in the document management server 10.

Because, in the system that records the derivation relationship among the operation IDs in the document management server 10, an electronic document which is a subject of each operation can be uniquely specified similar to the exemplary embodiment and the example modifications described above, the derivation relationship among the document IDs can be obtained from the derivation relationship among the operation IDs. For example, by focusing only on initial registration of an electronic document and registration of an updated version thereof in the derivation relationship among operation IDs while ignoring other operations, the derivation relationship among the document IDs can be obtained. Then, the document management server 10, by referring to the derivation relationship among the document IDs, can update the input-output relationship DB 130 similar to the exemplary embodiment and the example modifications described above.

The document management server 10, receiving an operation instruction including an operation ID within the reference information file, obtains a document ID corresponding to the operation ID from the derivation relationship DB 120. The document management server 10 then obtains an input-output relationship information record including the document ID as an input document ID, and performs the instructed operation with respect to an electronic document corresponding to the output document ID specified in the input-output relationship information record.

Figure 22:
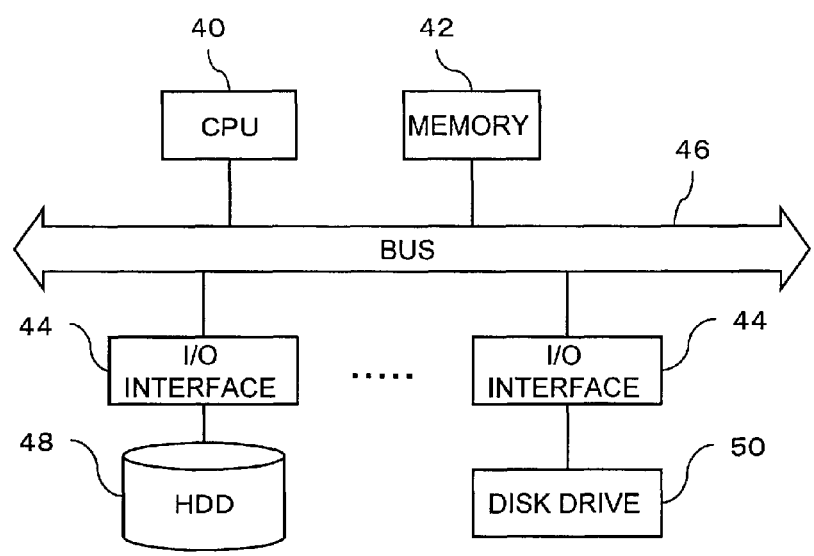
FIG. 22 is a view showing an example hardware structure of a computer.

The document management server 10 described above is typically implemented by executing a program that describes the function or process contents of each unit described above by a general-purpose computer. As shown in FIG. 22, the computer includes, as hardware, a circuit structure in which a CPU (central processing unit) 40 such as a microprocessor, a memory (primary memory) 42 such as a random access memory, various I/O (input/output) interfaces 44, and so on are interconnected via a bus 46, for example. Further, a hard disk drive 48 and a disk drive 50 for reading recording media of various standards, such as CDs and DVDs, are connected, via the I/O interfaces 44, for example, to the bus 46. (Here, an interface for a flash memory and so on can also be connected so that a non-volatile recording medium such as flash memory can be used in addition to the various disks described above.) Such a drive 48 or 50 functions as an external storage device for the memory. The program that describes the process contents of the exemplary embodiment is stored in a fixed storage device such as the hard disk drive 48 via a recording medium such as a CD or DVD or via the network, and then installed in the computer. When the program stored in the fixed storage device is read into the memory and performed by the CPU, the processing of the exemplary embodiment is implemented. Similarly, the client terminal 20 can be implemented by causing a general-purpose computer to perform a program that describes the document processing program described above.

The foregoing description of the exemplary embodiments of the present invention has been provided for the purposes of the illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. A document providing system including a processor, comprising:
    a derivation relationship storage unit;
    a derivation relationship registration unit that, when receiving an instruction to register a second electronic document that is an updated version of a first electronic document, registers a derivation relationship, in said derivation relationship storage unit, indicating that the second electronic document is derived from the first electronic document;
    an input-output relationship storage unit;
    an input-output relationship registration unit that generates input-output relationship information indicating an updated electronic document to be provided as an output document in response to a document request that designates a requested electronic document as an input document, based on the derivation relationship registered in said derivation relationship storage unit, and registers the input-output relationship information in said input-output relationship storage unit; and
    a providing unit that, when receiving a document request, obtains an updated electronic document as the output document corresponding to a requested electronic document as the input document designated in the document request based on the input-output relationship information and provides the updated electronic document that is obtained;
    said input-output relationship registration unit, when the derivation relationship indicating that the second electronic document is derived from the first electronic document is registered in said derivation relationship storage unit, generating new input-output relationship information indicating that, with regard to each of all electronic documents that are ancestors of the second electronic document in an derivation relationship tree structure represented by derivation relationships stored in said derivation relationship storage unit, an updated electronic document to be provided corresponding to a document request that designates the ancestor electronic document as a requested electronic document is the second electronic document, and registering said generated input-output relationship information;
    said providing unit providing the output document when said providing unit receives a document request that designates the input document as the requested document.

2. The document providing system according to claim 1, wherein said input-output relationship registration unit registers, with regard to an ancestor electronic document that satisfies a predetermined limiting condition among ancestor electronic documents of the second electronic document in the derivation relationship tree structure, input-output relationship information indicating that an updated electronic document to be provided corresponding to a document request that designates the ancestor electronic document as a requested electronic document is the second electronic document.

3. The document providing system according to claim 2, wherein said input-output relationship registration unit uses, as the limiting condition, a condition that limits the ancestor electronic documents to an ancestor electronic document registered in said derivation relationship storage unit on time and date that is within a predetermined period from time and date when the second electronic document is registered.

4. The document providing system according to claim 1, further comprising:
    a deleting unit that, when first input-output relationship information is registered in said input-output relationship storage unit, deletes second input-output relationship information in which a requested electronic document in the first input-output relationship information is an updated electronic document to be provided in accordance with the document request.

5. The document providing system according to claim 1, wherein said input-output relationship registration unit, when the derivation relationship indicating that the second electronic document is derived from the first electronic document is registered in said derivation relationship storage unit including the updated version of the second electronic document and each ancestor of the second electronic document, displays a derivation relationship tree structure represented by derivation relationships stored in said derivation relationship storage unit, and receives designation of one or more electronic documents that are ancestors of the second electronic document on the display and registers input-output relationship information indicating that the second electronic document is to be provided in response to a document request with regard to the designated electronic document.

6. A computer readable recording medium storing a program causing a computer to execute a process for providing electronic documents, the process comprising:
   registering, when receiving an instruction to register a second electronic document that is an updated version of a first electronic document, a derivation relationship indicating that the second electronic document is derived from the first electronic document in a derivation relationship storage unit;
   generating input-output relationship information indicating an updated electronic document to be provided as an output document in response to a document request that designates a requested electronic document as an input document, based on the derivation relationship registered in the derivation relationship storage unit, and registering the input-output relationship information in an input-output relationship storage unit;
   when receiving a document request, obtaining an updated electronic document as the output document corresponding to a requested electronic document as the input document designated in the document request based on the input-output relationship information and providing the updated electronic document that is obtained;
   when the derivation relationship indicating that the second electronic document is derived from the first electronic document is registered in the derivation relationship storage unit, generating new input-output relationship information indicating that, with regard to each of all electronic documents that are ancestors of the second electronic document in derivation relationship tree structure represented by derivation relationships stored in the derivation relationship storage unit, an updated electronic document to be provided corresponding to a document request that designates the ancestor electronic document as a requested electronic document is the second electronic document, and registering the generated input-output relationship information; and
   providing the output electronic document when a received document request designates the input document as the requested document.

7. The recording medium according to claim 6, wherein the registering of the input-output relationship information comprises registering, with regard to an ancestor electronic document that satisfies a predetermined limiting condition among ancestor electronic documents of the second electronic document in the derivation relationship tree structure, input-output relationship information indicating that an updated electronic document to be provided in response to a document request that designates the ancestor electronic document as a requested electronic document is the second electronic document.

8. The recording medium according to claim 7, wherein the registering of the input-output relationship information comprises using, as the limiting condition, a condition that limits the ancestor electronic documents to an ancestor electronic document registered in the derivation relationship storage unit on time and date that is within a predetermined period from time and date when the second electronic document was registered.

9. The recording medium according to claim 6, wherein the process further comprising:
   deleting, when first input-output relationship information is registered in the input-output relationship storage unit, second input-output relationship information in which a requested electronic document in the first input-output relationship information is an updated electronic document to be provided in accordance with the document request.

10. The recording medium according to claim 6, wherein the registering of the input-output relationship information comprises, when the derivation relationship indicating that the second electronic document is derived from the first electronic document is registered in the derivation relationship storage unit including the updated version of the second electronic document and each ancestor of the second electronic document, displaying a derivation relationship tree structure represented by derivation relationships stored in the derivation relationship storage unit, and receiving designation one or more electronic documents that are ancestors of the second electronic document on the display and registering input-output relationship information indicating that the second electronic document is to be provided in response to a document request with regard to the designated electronic document.

11. A method for providing electronic documents, comprising:
   registering, using a processor, when receiving an instruction to register a second electronic document that is an updated version of a first electronic document, a derivation relationship indicating that the second electronic document is derived from the first electronic document in a derivation relationship storage unit;
   generating, using a processor, input-output relationship information indicating an updated electronic document to be provided as an output document in response to a document request that designates a requested electronic document as an input document, based on the derivation relationship registered in the derivation relationship storage unit, and registering the input-output relationship information in an input-output relationship storage unit;
   when receiving a document request, obtaining, using a processor, an updated electronic document as the output document corresponding to a requested electronic document as the input document designated in the document request based on the input-output relationship information and providing the updated electronic document that is obtained;
   when the derivation relationship indicating that the second electronic document is derived from the first electronic document is registered in the derivation relationship storage unit, generating new input-output relationship information indicating that, with regard to each of all electronic documents that are ancestors of the second electronic document in a derivation relationship tree structure represented by derivation relationships stored in the derivation relationship storage unit, an updated electronic document to be provided corresponding to a document request that designates the ancestor electronic document as a requested electronic document is the second electronic document, and registering the generated input-output relationship information; and providing the output electronic document when a received document request designates the input document as the requested document.

12. The method according to claim 11, wherein the registering of the input-output relationship information comprises registering, with regard to an ancestor electronic document that satisfies a predetermined limiting condition among ancestor electronic documents of the second electronic document in the derivation relationship tree structure, input-output relationship information indicating that an updated electronic document to be provided in response to a document request that designates the ancestor electronic document as a requested electronic document is the second electronic document.

13. The method according to claim 12, wherein the registering of the input-output relationship information comprises using, as the limiting condition, a condition that limits the ancestor electronic documents to an ancestor electronic document registered in the derivation relationship storage unit on time and date that is within a predetermined period from time and date when the second electronic document was registered.

14. The method according to claim 11, wherein the process further comprising:
deleting, when first input-output relationship information is registered in the input-output relationship storage unit, second input-output relationship information in which a requested electronic document in the first input-output relationship information is an updated electronic document to be provided in accordance with the document request.

15. The method according to claim 11, wherein the registering of the input-output relationship information comprises, when the derivation relationship indicating that the second electronic document is derived from the first electronic document is registered in the derivation relationship storage unit including the updated version of the second electronic document and each ancestor of the second electronic document, displaying a derivation relationship tree structure represented by derivation relationships stored in the derivation relationship storage unit, and receiving designation one or more electronic documents that are ancestors of the second electronic document on the display and registering input-output relationship information indicating that the second electronic document is to be provided in response to a document request with regard to the designated electronic document.

* * * * *